INVENTORS
FLORENTIN J. PEARNE
FRANK S. PEARNE
FREDERICK G. ROBSON
ATTORNEYS

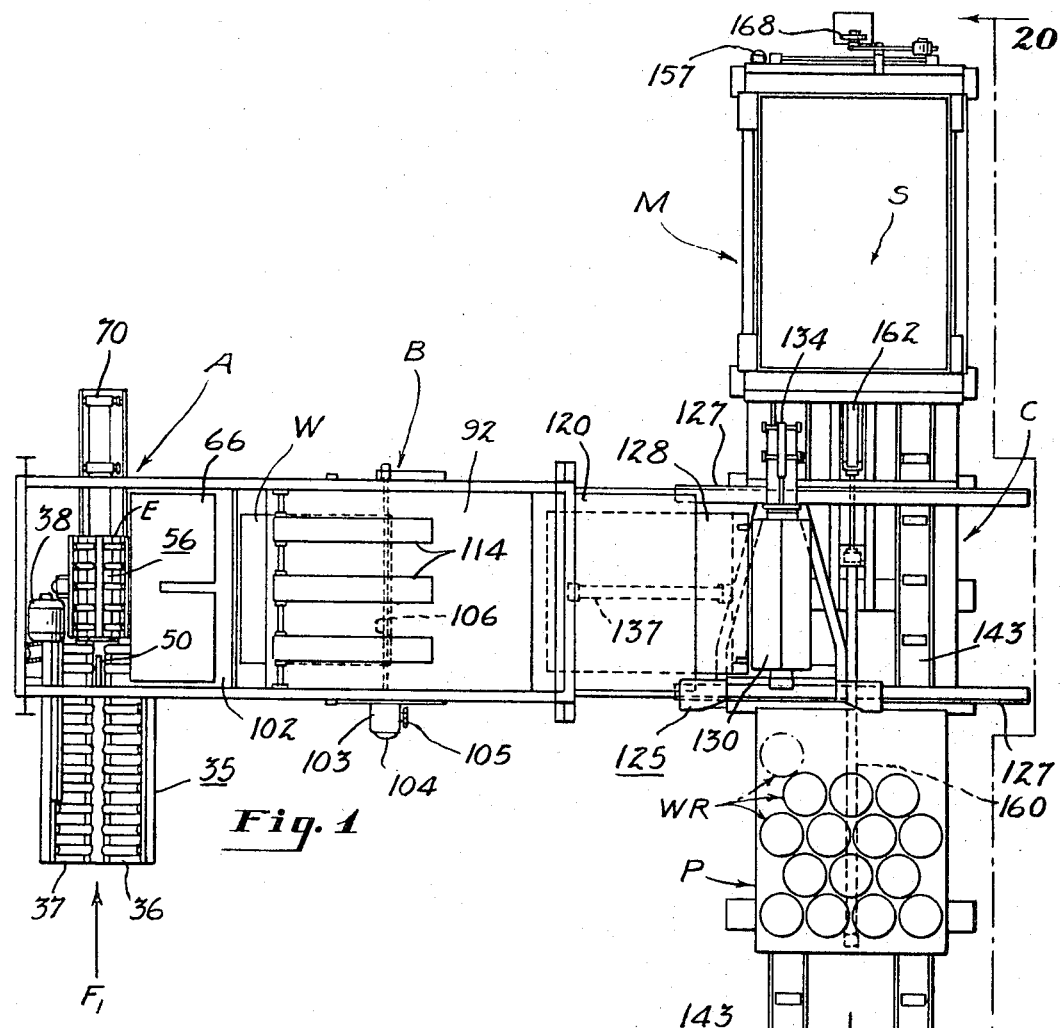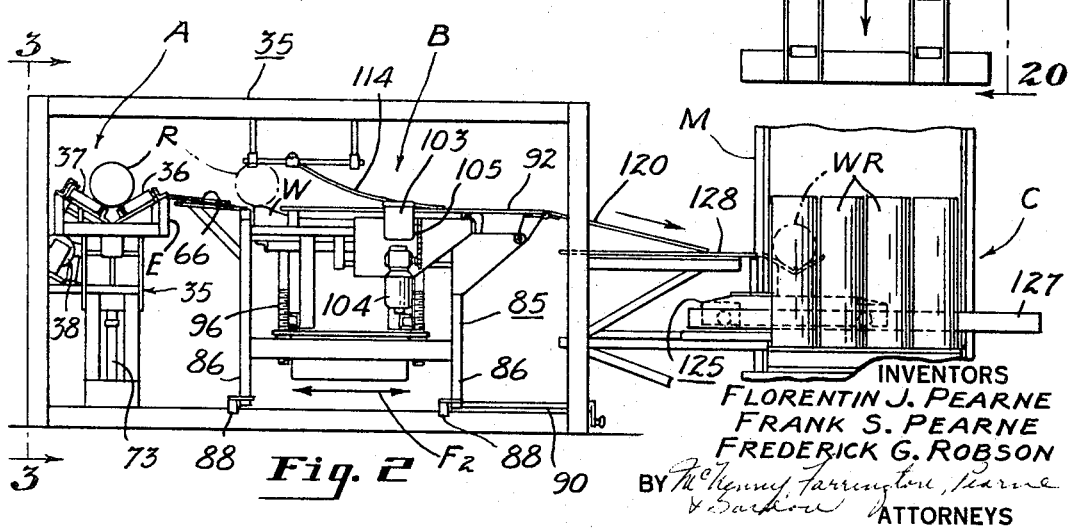

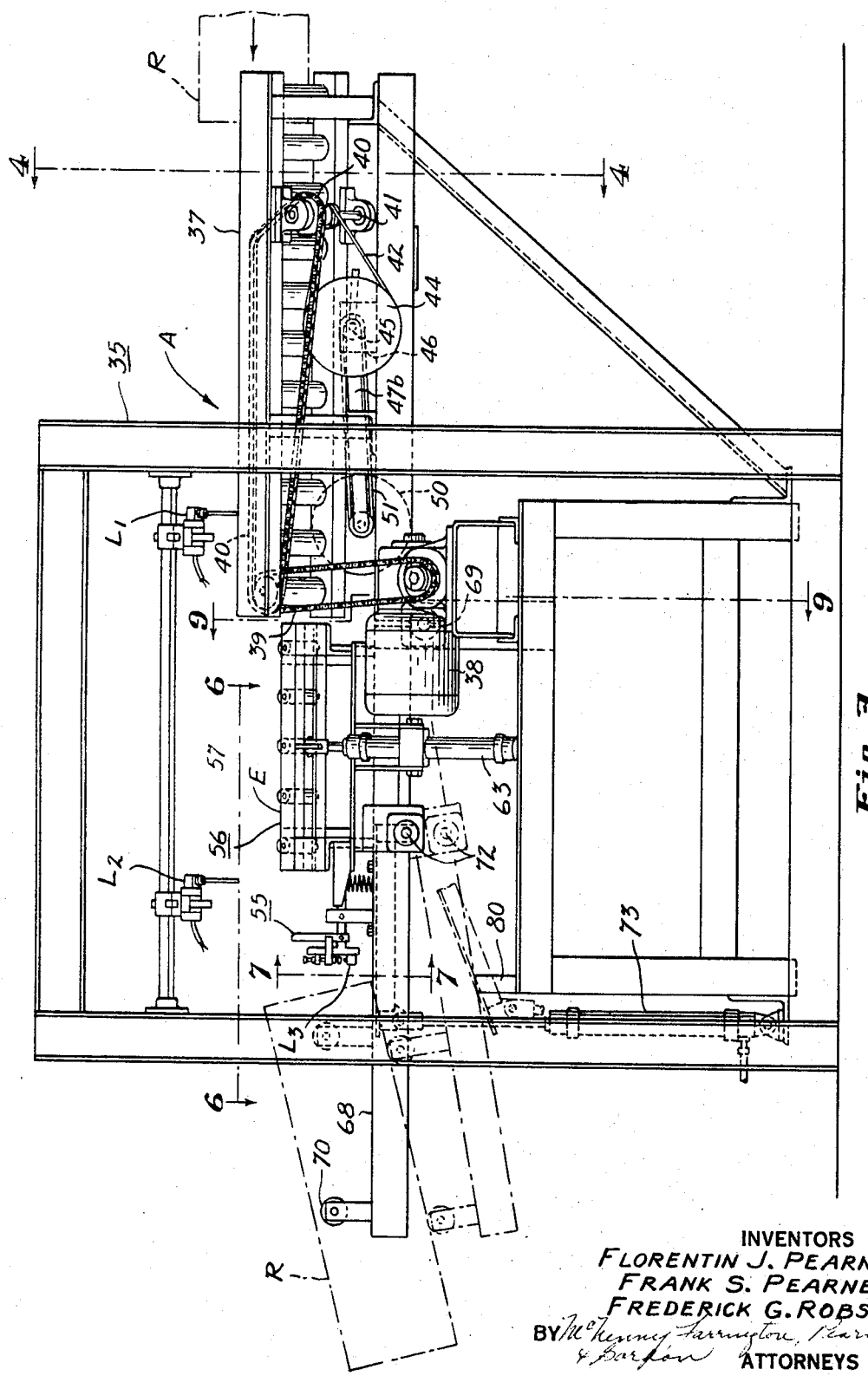

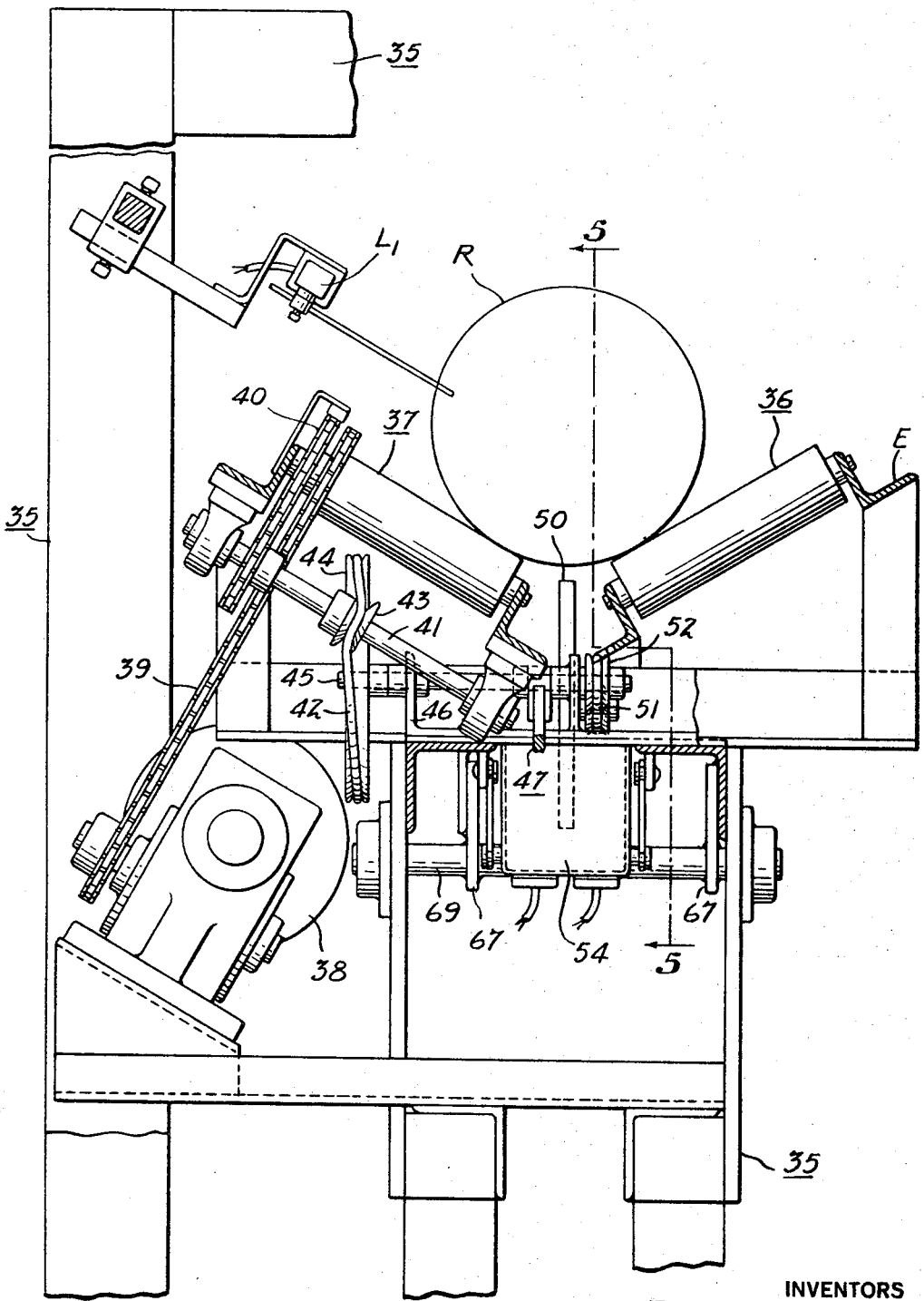

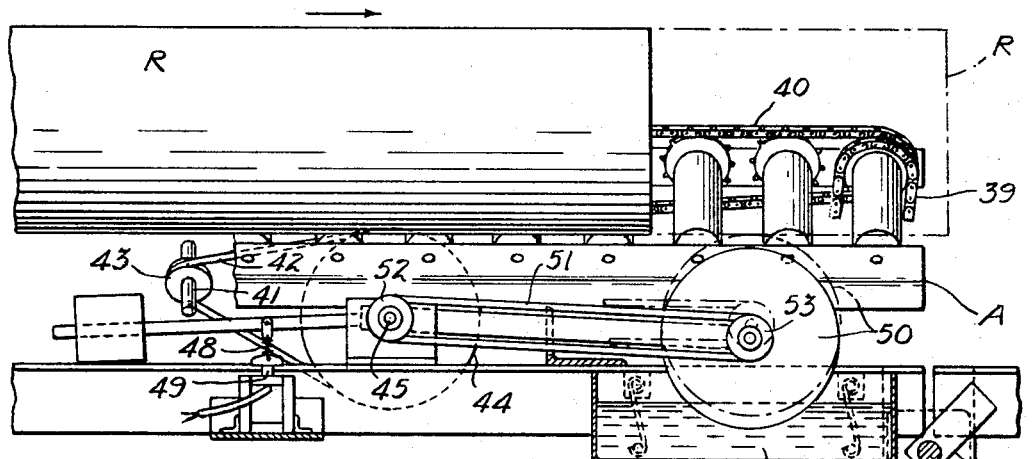
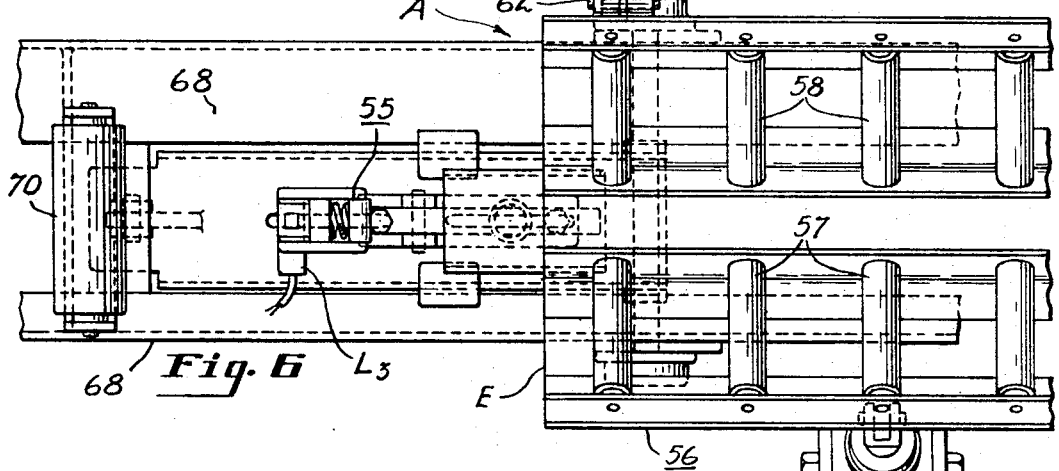
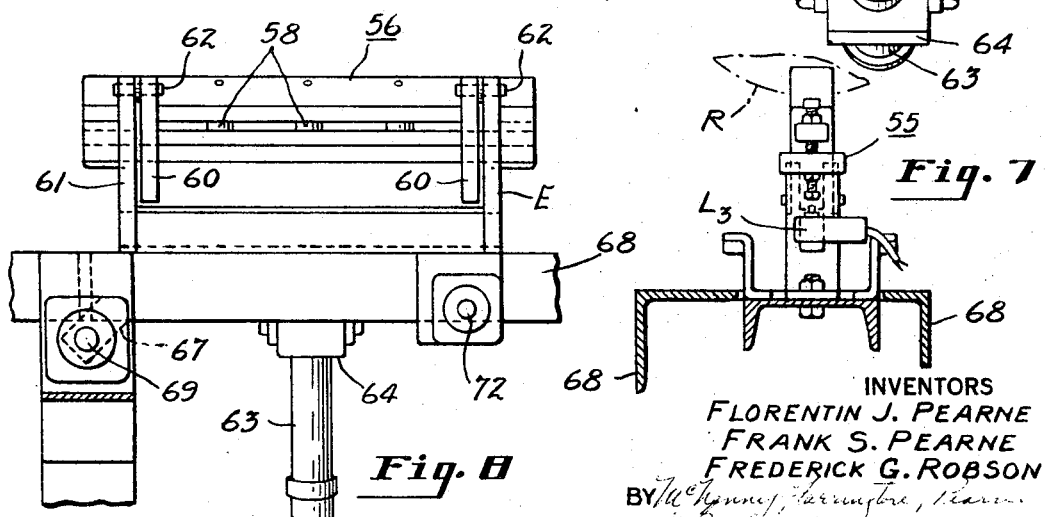

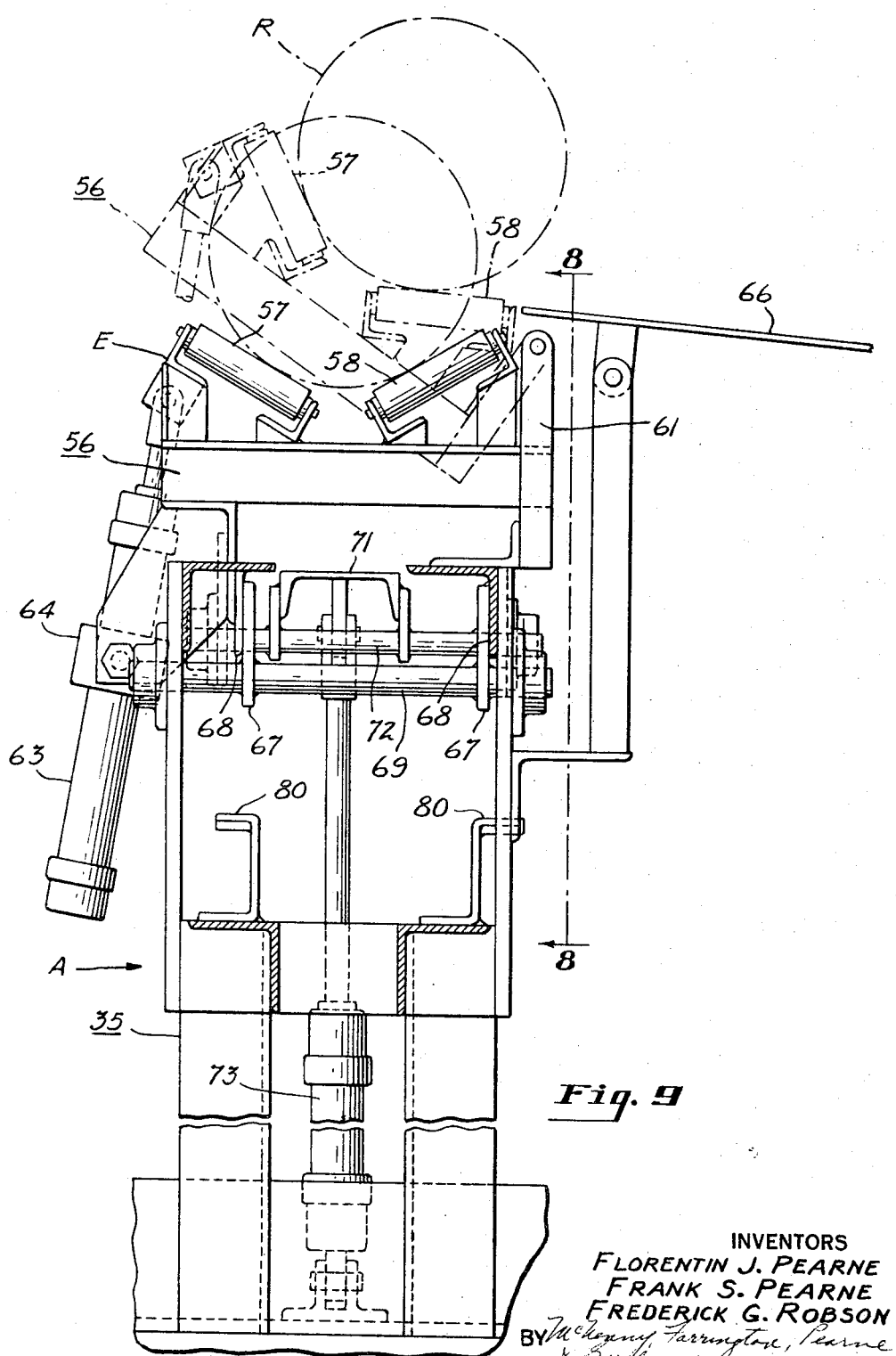

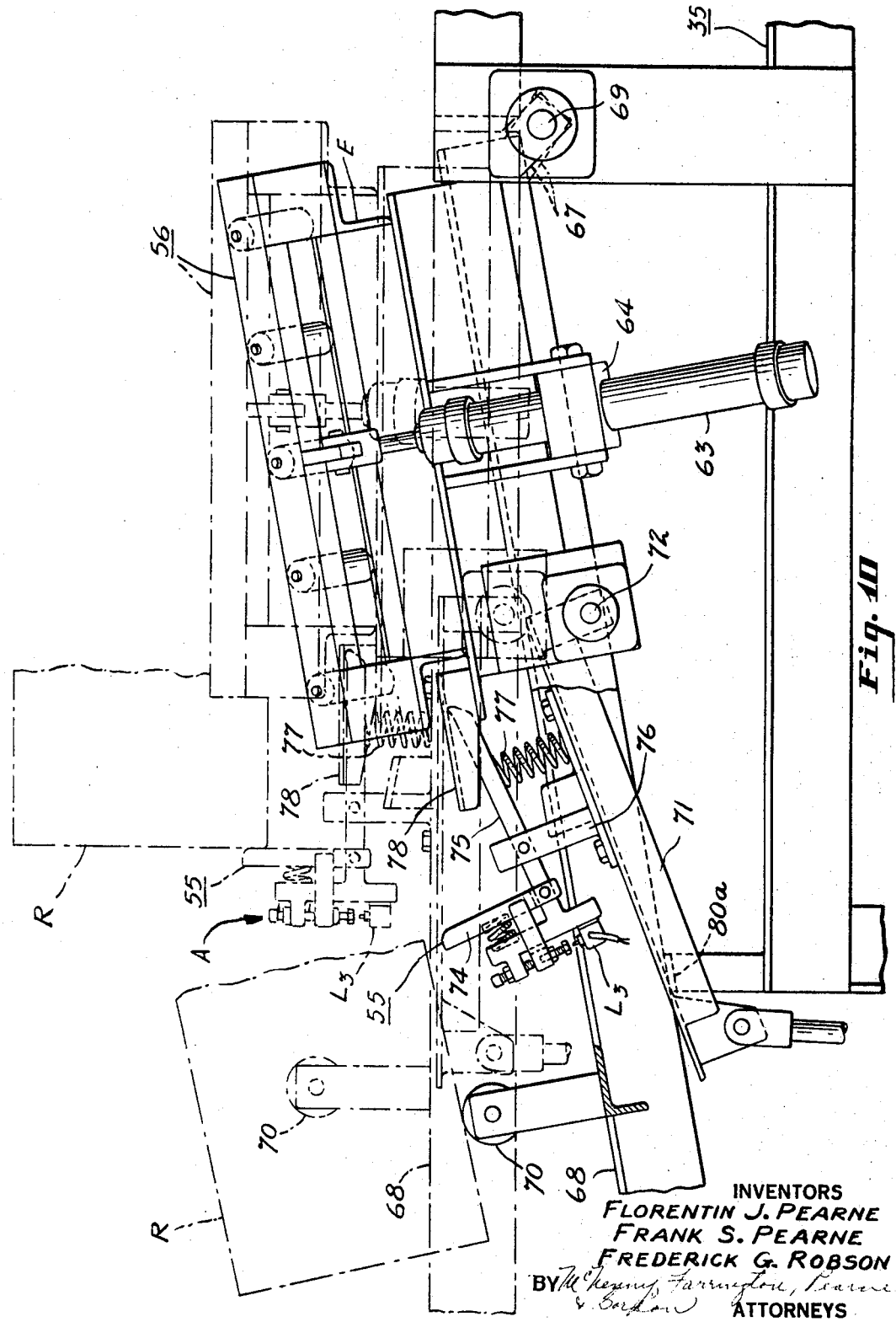

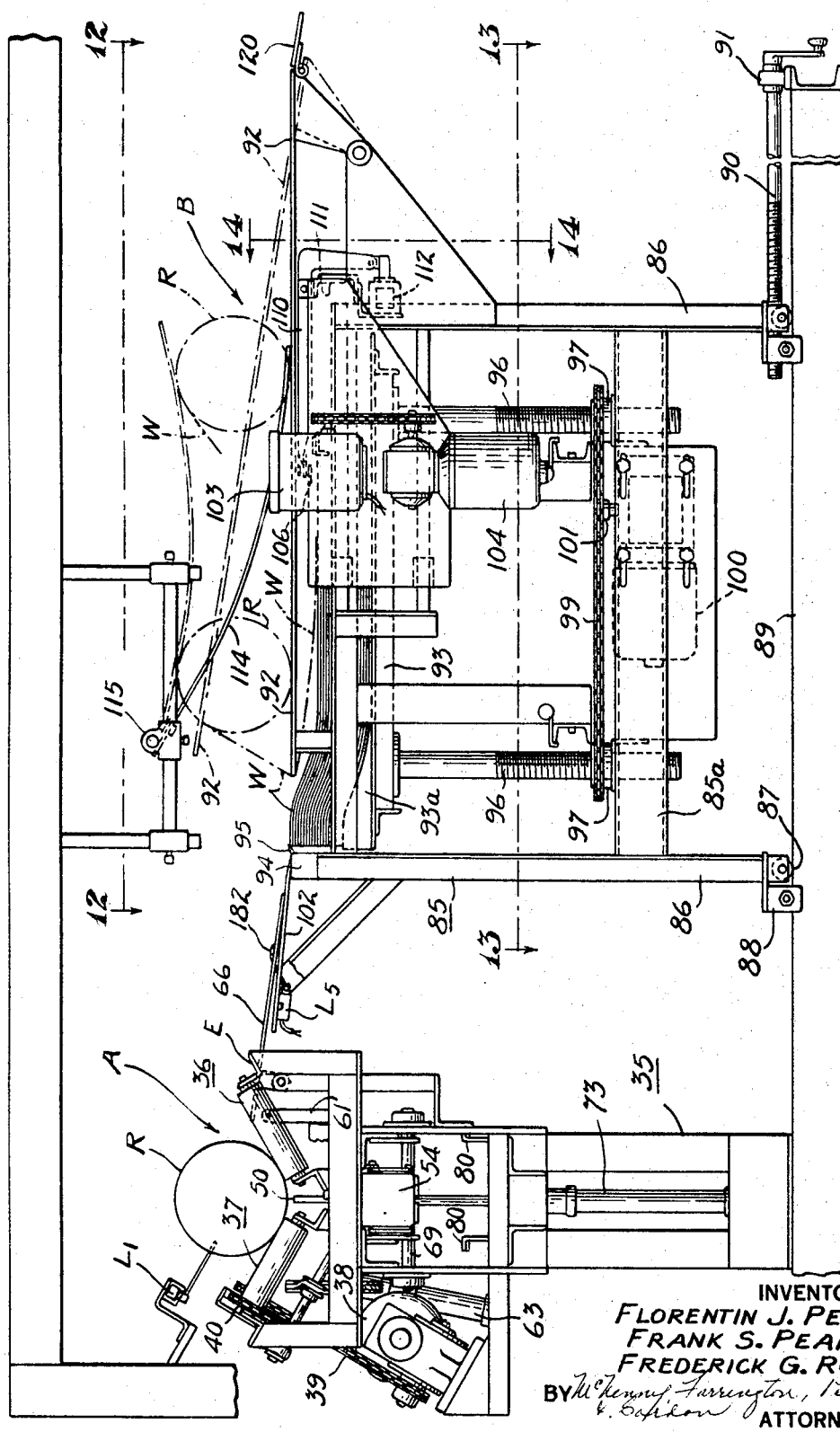

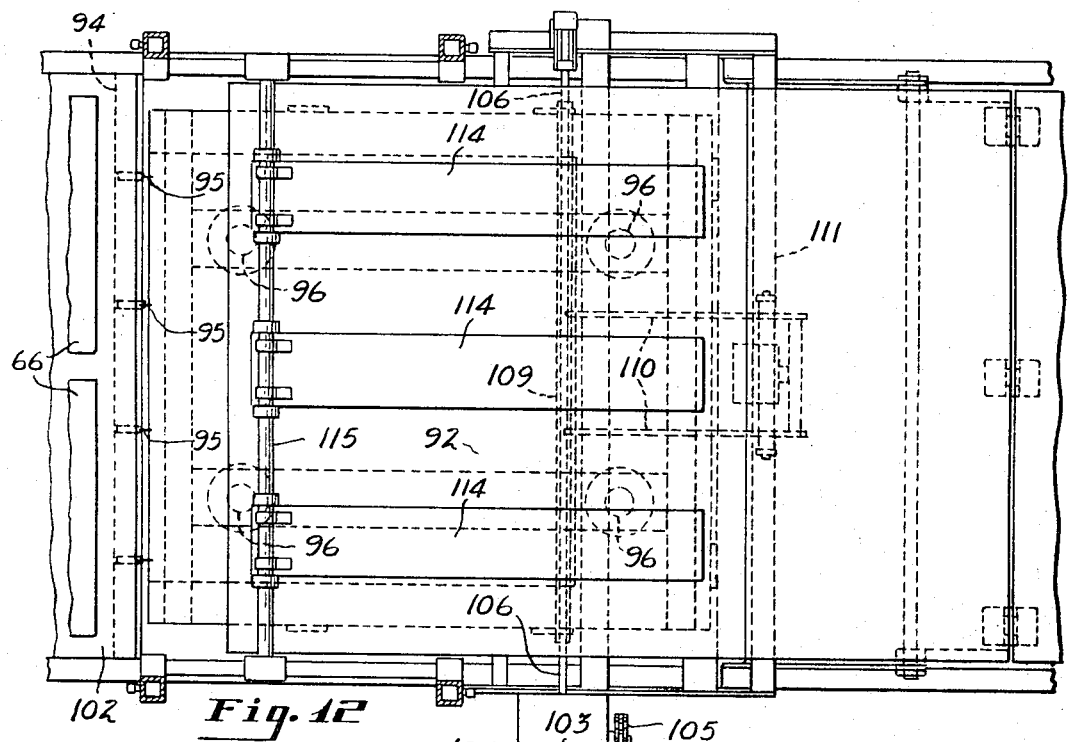
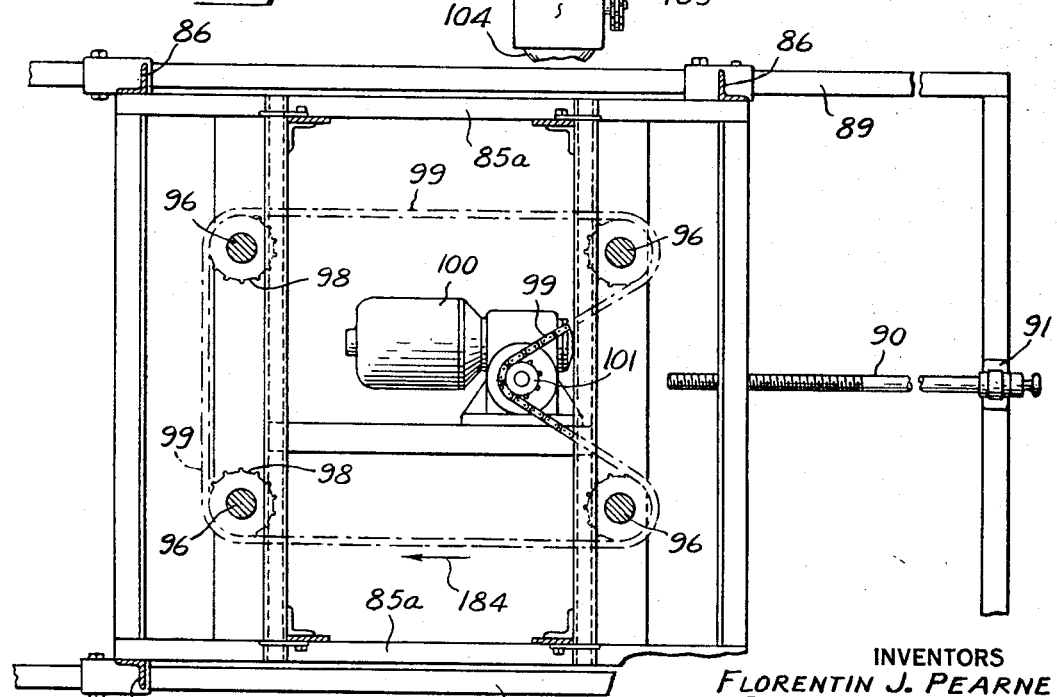

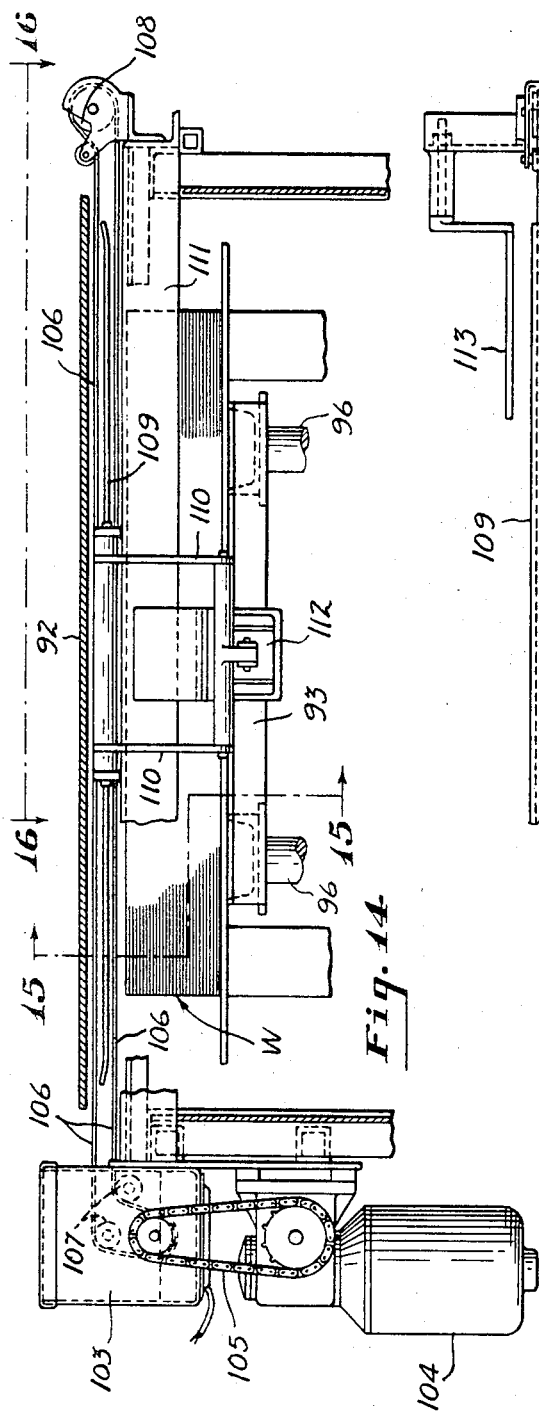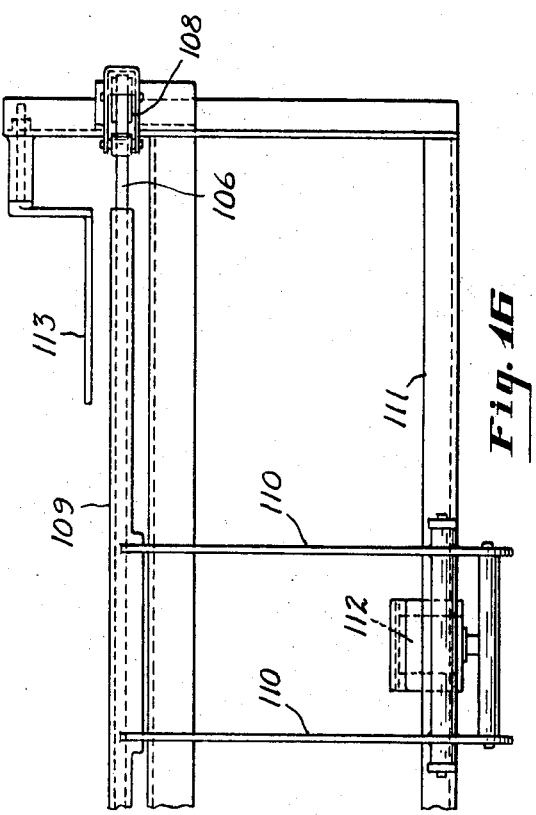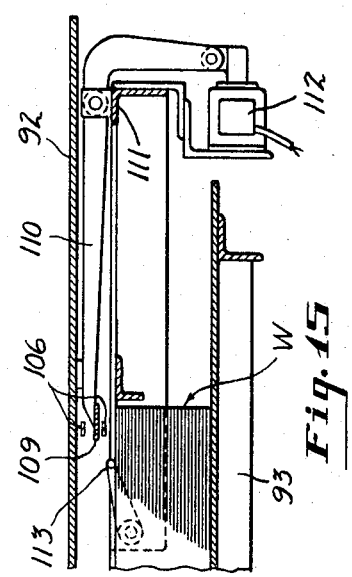

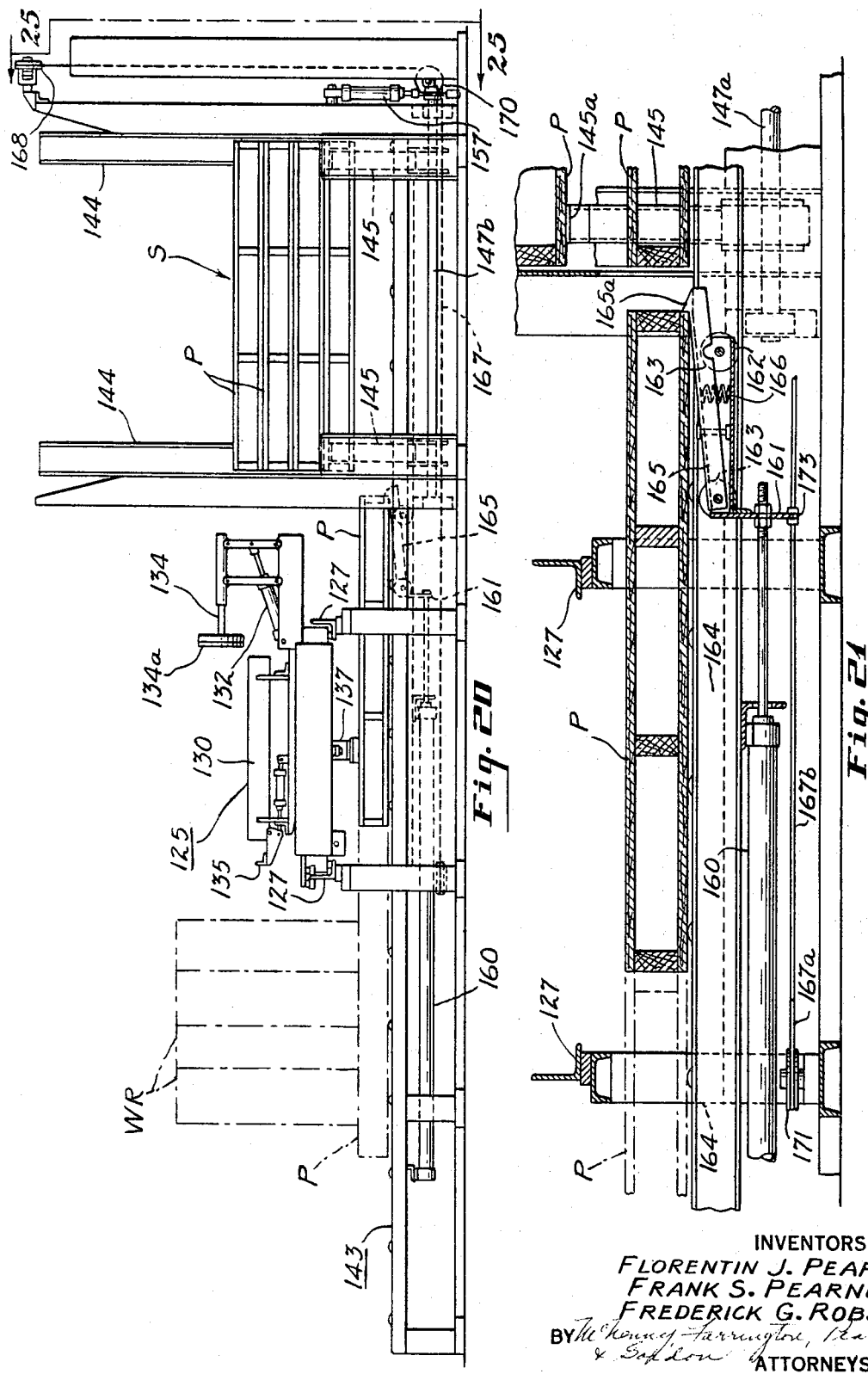

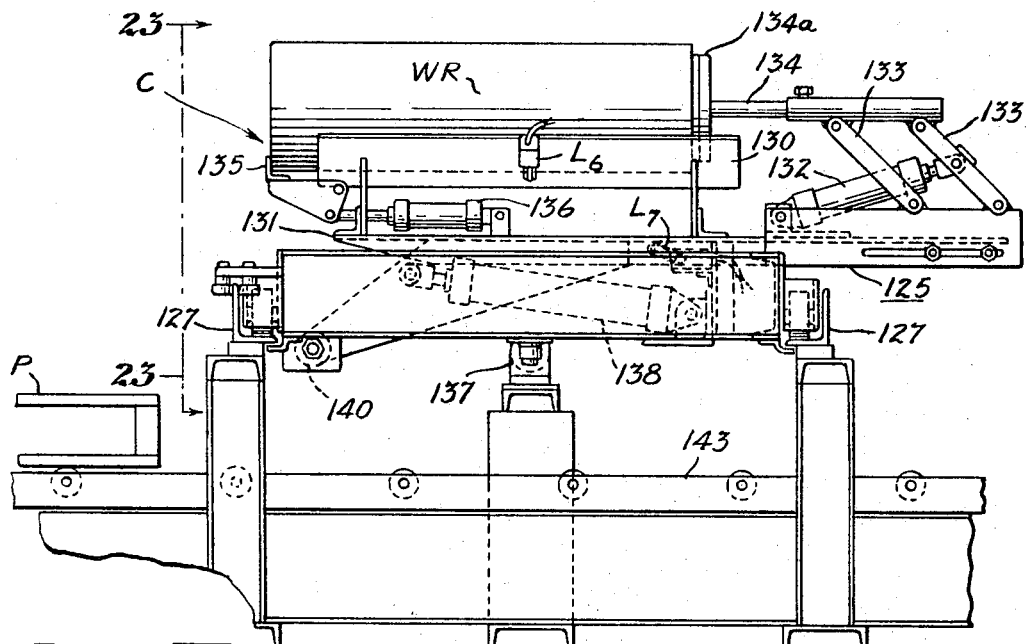
Fig. 22
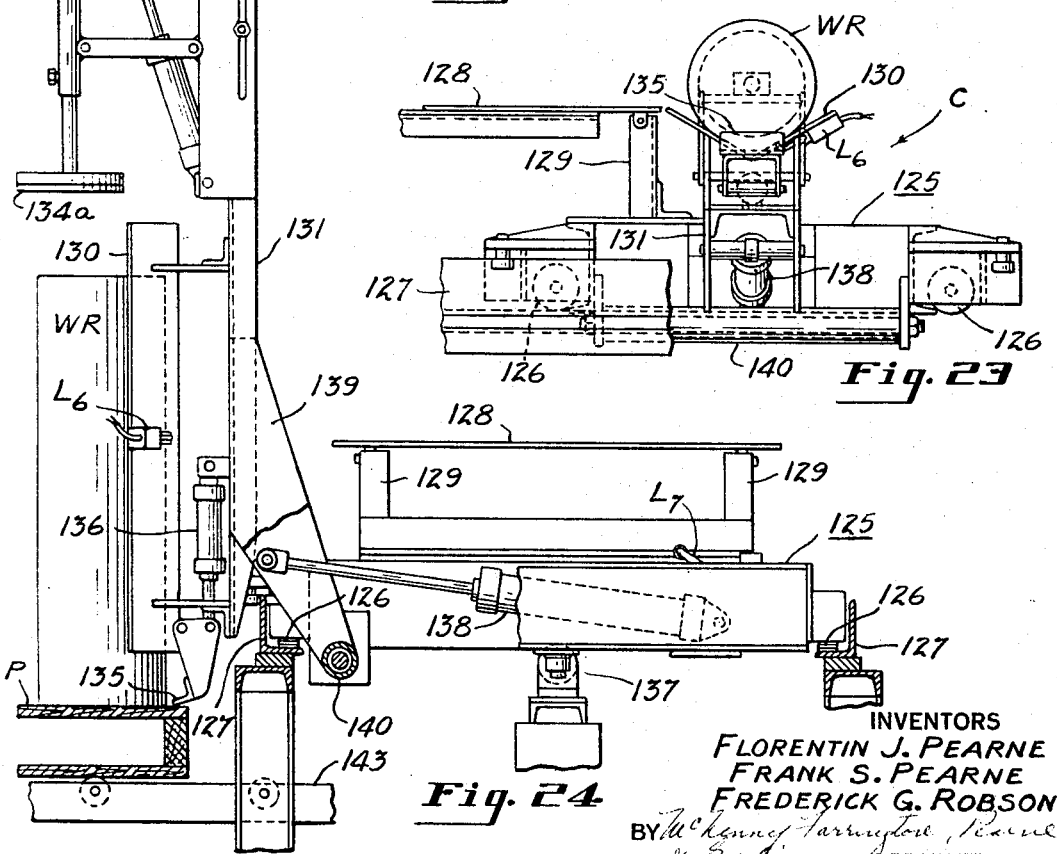
Fig. 23
Fig. 24

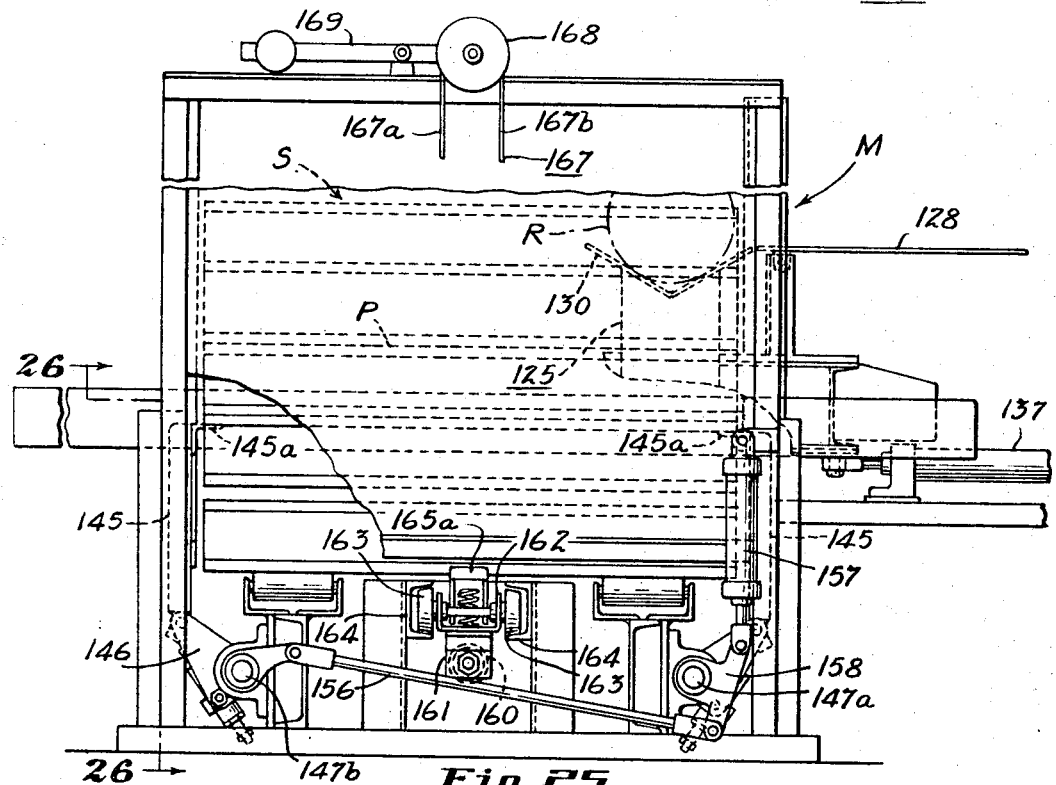
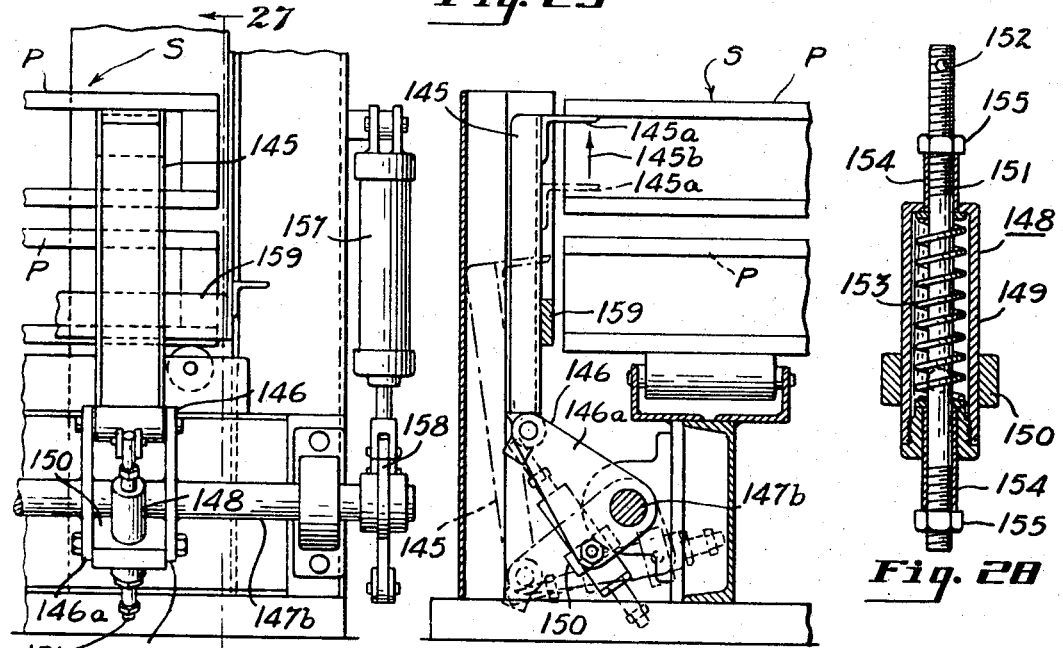

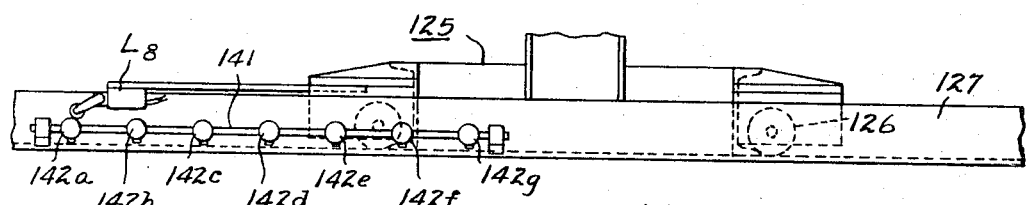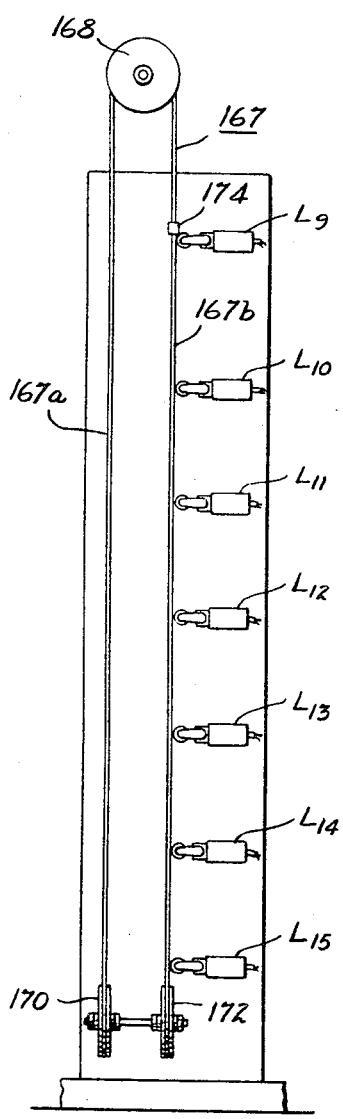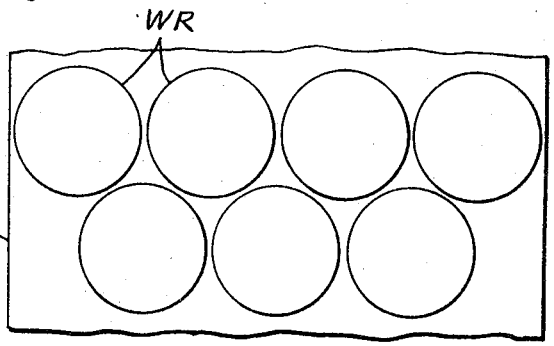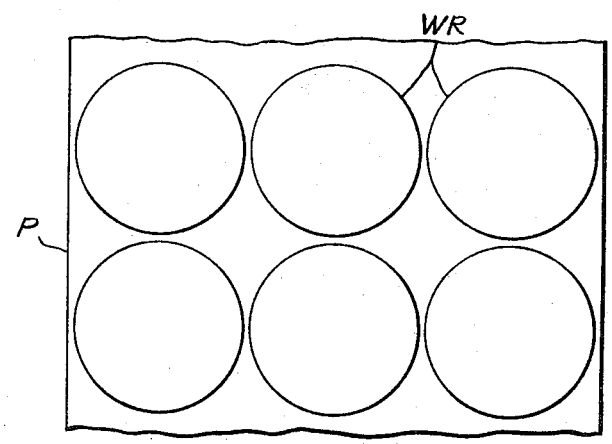

United States Patent Office 3,436,895
Patented Apr. 8, 1969

3,436,895
WRAPPING AND PALLETIZING OF CYLINDRICAL PRODUCTS
Florentin J. Pearne, Alhambra, Frank S. Pearne, San Gabriel, and Frederick G. Robson, Long Beach, Calif., assignors to Pearne and Lacy Machine Company, Inc., Los Angeles, Calif., a corporation of California
Filed July 1, 1965, Ser. No. 468,706
Int. Cl. B65b 11/04, 57/10; E04d 5/00
U.S. Cl. 53—214    12 Claims

ABSTRACT OF THE DISCLOSURE

A mechanized and fully automated wrapping and palletizing apparatus for cylindrical articles including a feeding section, a wrapping section, and a palletizing section. All sections cooperate in moving the articles from one section to the next through the machine and depositing them upended in a predetermined pattern on a receiving surface. The wrapping and palletizing operations are responsive to the presence of the cylindrical article as it makes a rolling transition from one section to the next. The apparatus will accommodate different lengths of cylindrical rolls with a minimum of adjustments.

---

The present invention relates to the wrapping and palletizing of cylindrical products and, more particularly, to improved apparatus for wrapping the exteriors of cylindrically shaped articles and then stacking the wrapped articles on pallets or the like for transfer to a place of storage or shipment.

In many industries it is necessary or desirable to apply an overwrap to rather heavy and bulky cylindrical products and then temporarily to store the wrapped products until such time as they may be further handled, as for shipping to a place of use or sale. A typical example is a roll of roofing paper which may measure, for example, about three feet in length and about eight to ten inches in diameter and weigh anywhere from about 40 to about 110 pounds.

At present the wrapping of roofing paper is performed almost entirely by hand operations. The work is strenuous and tedious, and the results are not always as uniform as normally achieved by machine controlled operations. It would, therefore, be desirable and advance the art if an entire wrapping and palletizing operation could be completely mechanized and automated with a reduced requirement for the kind of manual labor heretofore employed. These desiderata have been achieved by the present invention.

In accordance with the invention, a succession of cylindrically shaped articles is advanced endwise to a feed mechanism which, alternatively, can either reject each article, if unacceptable for any reason, or advance it to a wrapping operation. This operation, likewise, is carried out automatically and includes several features that adjust automatically to accommodate the gradual depletion of a stack of wrapping paper. Finally, the cylindrically shaped articles are received from the wrapping operation and automatically stacked on end for further handling atop pallets which are incrementally moved at appropriately timed intervals, all, again, with minimum intervention of an operator, as will hereinafter be more fully described.

It is, therefore, the principal object of the present invention to provide improved apparatus for wrapping and palletizing cylindrical products, such as rolls of roofing paper.

Another object is to provide fully automated apparatus for the wrapping and palletizing of such cylindrical objects.

A further object is to provide feeding apparatus for cylindrically shaped objects which can reject or accept for further processing each of a continuous succession of such articles.

A still further object is to provide wrapping apparatus for such objects which automatically compensates for the gradual depletion of a stack of wrapping paper.

A still further object is to provide automatic palletizing apparatus adapted to stack rolls or the like in even or staggered patterns on pallets or other receiving surfaces.

A still further object is to provide an indexing system for pallets that are to be loaded.

Another and basically important object of the invention is to provide feeding, rejecting, wrapping, and palletizing machine components of such designs that each is adapted to be integrated with the others for cooperation in the sequential handling of objects to be wrapped with a minimum of attention and intervention by operating personnel.

Other objects and advantages will become apparent from the following description and from the accompanying drawings wherein:

FIGS. 1 and 2 are plan and side elevational views, respectively, of one form of apparatus embodying the present invention;

FIG. 3 is an end elevation of the apparatus of FIGS. 1 and 2, as indicated by the line 3—3 in FIG. 2;

FIG. 4 is a vertical sectional view taken as indicated by the line 4—4 in FIG. 3;

FIG. 5 is a vertical sectional view taken as indicated by the line 5—5 in FIG. 4;

Figure 17:
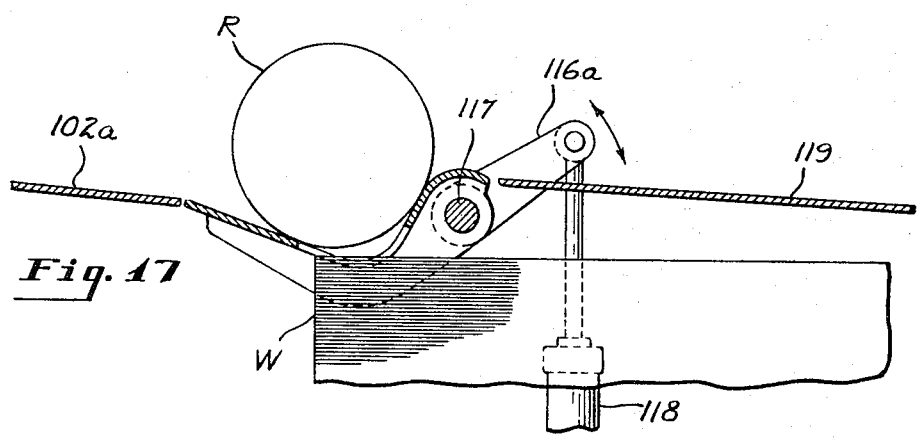
Figure 18:
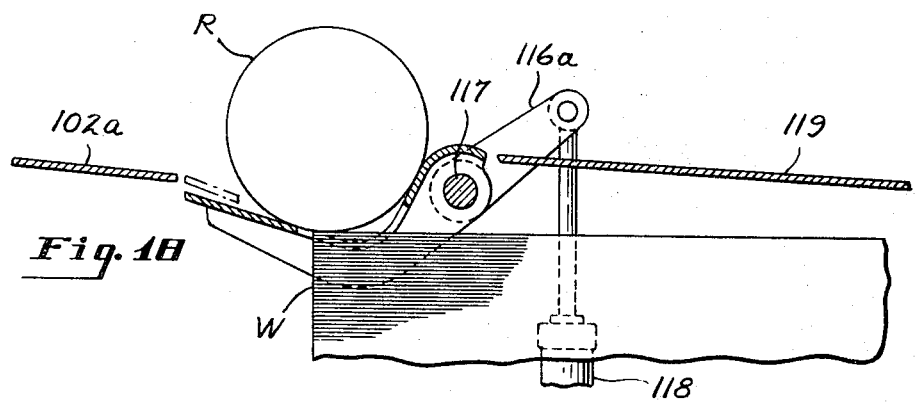
Figure 19:
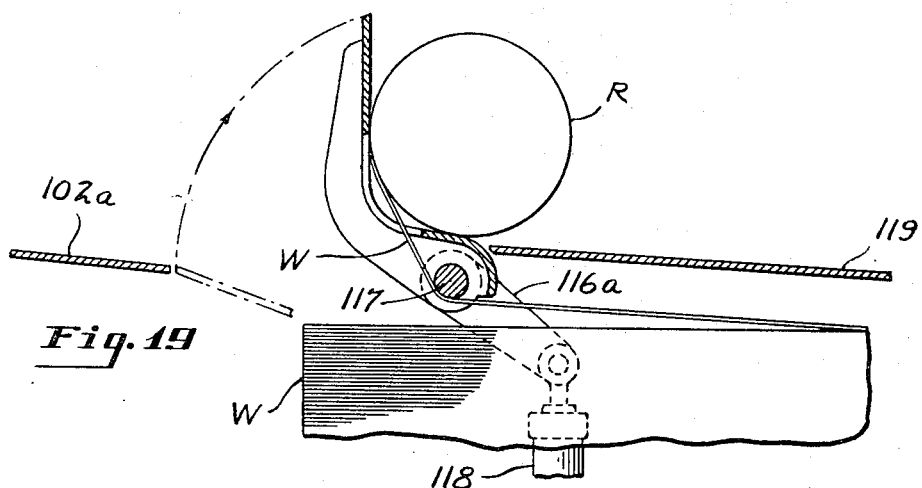

FIG. 6 is a fragmentary plan view and FIGS. 7 and 9 are fragmentary sectional and elevational views, respectively taken as indicated by the lines 6—6, 7—7, and 9—9 of FIG. 3;

FIG. 8 is a fragmentary side elevational view of the tiltable cradle of the apparatus, taken from the opposite side from that shown in FIG. 3, as indicated by the line 8—8 of FIG. 9;

FIG. 10 is an enlarged, fragmentary, elevational view of the ejecting mechanism shown in FIG. 3 after its actuation to an ejecting position;

FIG. 11 is an enlarged side elevational view of the left-hand portion of FIG. 2 illustrating the feeding apparatus in conjunction with the wrapping apparatus;

FIGS. 12 and 13 are fragmentary horizontal sections and FIG. 14 is a fragmentary vertical section, respectively taken as indicated by the lines 12—12, 13—13, and 14—14 of FIG. 11;

FIGS. 15 and 16 are fragmentary, horizontal and vertical sections, respectively taken as indicated by the line 15—15 and 16—16 of FIG. 14;

FIGS. 17, 18, and 19 are fragmentary, semi-diagrammatic, sequential views showing in vertical section a modified mechanism for controlling the movement of a cylindrical work article as it rolls into the wrapping mechanism of the apparatus;

FIG. 20 is an elevational view of the palletizing mechanism of the apparatus of FIG. 1, as indicated therein by the line 20—20;

FIG. 21 is an enlarged, fragmentary, longitudinal, vertical section of the underlying support for the palletizing mechanism of FIG. 20;

FIG. 22 is an enlarged, fragmentary, elevational view of the upending portion of the palletizing mechanism of FIG. 20;

FIG. 23 is a fragmentary elevational view of the upending mechanism, taken as indicated by the line 23—23 of FIG. 22;

FIG. 24 is an enlarged, fragmentary, elevational view similar to FIG. 22 but showing the upending mechanism after actuation to dispose a wrapped cylindrical object on end on a pallet;

FIG. 25 is a partly broken away, side elevational view of the pallet magazine portion of the palletizing mechanism as indicated by the line 25—25 of FIGURE 20;

FIG. 26 is an enlarged, fragmentary, elevational view of the left-hand portion of the magazine actuator of FIG. 25, as indicated therein by the line 26—26, and illustrates part of the linkage mechanism for releasing a pallet;

FIG. 27 is a fragmentary, vertical section of the magazine actuator taken as indicated by the line 27—27 of FIG. 26;

FIG. 28 is a longitudinal section of one of a pair of spring loaded toggle-acting devices used in the magazine actuator of FIGS. 25 through 27;

FIG. 29 is a semi-schematic, side elevational view of switch means on the palletizing mechanism for controlling the placement of the upended, wrapped rolls on pallets;

FIGS. 30 and 31 are plan views of rolls placed on a pallet and illustrate two possible patterns of roll placement; and FIG. 32 is a semi-schematic, side elevational view of a switch arrangement (fragmentarily shown in FIG. 25) for controlling the indexing or advance of successive pallets to the upending mechanism of FIG. 22.

GENERAL ORGANIZATION AND OPERATION

In general, as shown in FIG. 1, the illustrative apparatus comprises a feeding section designated A; a wrapping section designated B; and a palletizing section designated C. For purposes of illustration and description, these sections are considered in detail in the order named. The operation is entirely automatic from the time that an object to be wrapped enters the feeding section of the apparatus in the direction indicated by arrow F in FIG. 1 until a load of wrapped objects is upended on a pallet in a desired pattern and discharged from the palletizing section in the direction indicated by the arrow D in FIG. 1.

The cylindrical articles or objects adapted to be advantageously wrapped and palletized in accordance with the present invention may be any of a wide variety of types but, in general, will be of such length, diameter, and weight that manipulating them with a minimum number of stops and starts and a minimum need for changing their orientation has important advantages. Moreover, the natural tendency of such objects to roll when resting on their cylindrical sides presents certain problems in controlling them while they are supported in that manner, as well as giving them a type of mobility that can facilitate manipulating them through certain kinds of operations. Accordingly, the cooperative relationship and relative physical dispositions of the feeding, wrapping, and palletizing sections A, B, and C of the machine have been organized in the particular manner shown in FIGS. 1 and 2 so as to take maximum advantage of the physical characteristics of such articles or objects while minimizing the problems created by those characteristics and, at the same time, accommodate each of the three main sections A, B, and C of the machine to the demands of the other sections with which they must cooperate in moving the articles or objects from one section to the next through the machine as a whole.

Thus, in the feeding section A of the machine, a strip or stripe of adhesive is applied to each article or object to be wrapped (hereinafter, for purposes of illustration, referred to as roll R of roofing paper) as it moves in the direction of the arrow $F_1$ axially and horizontally along a predetermined feeding path toward and onto a transfer mechanism E. To facilitate the application of a strip or stripe of adhesive along a straight and truly longitudinally line as required by the mode of operation of the wrapping section B of the machine, it is important that the roll R travel axially through the feeding section A of the machine without any rotation about the axis of the roll until it is in position for transfer to the wrapping section B. This enables the roll R to be started along a rolling path through the wrapping section B from a position and orientation on the transfer mechanism such that the strip or stripe of adhesive lies in a precisely predetermined location circumferentially of the roll R as it rests on the transfer mechanism E.

Having in that manner insured the precise circumferential location of the adhesive on the roll R, the roll is then started on its travel toward and through the wrapping section B of the machine with a rolling action down an inclined ramp along a second predetermined path in a direction transverse to (most suitably perpendicular to) the original, predetermined, feeding path. In the second predetermined path through the wrapping section B of the machine, a stack of wrappers W is disposed and so located and oriented relative to the transfer mechanism E that the strip or stripe of adhesive on the roll R moves about the axis of the roll as it rolls and engages and adheres to the top surface of the top wrapper W closely adjacent the nearest edge thereof without having engaged the ramp leading from the transfer mechanism. This requires that the roll R turn less than 360° about its axis while rolling on the ramp, but a precisely determined number of degrees from its starting position on the transfer mechanism by the time it reaches the stack of wrappers W.

The required control over the amount of that rotation of the roll R also, as a practical convenience, and as a necessity if rolls R of different diameters are to be handled by the same machine, requires that at least the above-described portion of the wrapping section B of the machine be adjustably movable toward and away from the feeding section A as indicated by the arrow $F_2$ in FIGS. 1 and 2. This is provided for by the invention in the manner hereinafter described and involves extension and retraction of the ramp between the feeding and wrapping sections A and B of the machine.

As also described hereinafter, the roll R picks up the adhered top wrapper W and is wrapped therein as it continues to roll along the above-mentioned, second, predetermined path and down another ramp through a discharge station to the palletizing section C of the machine. Here, the wrapped roll WR is stopped at any one of a series of predetermined upending stations for upending the wrapped rolls one after another onto a pallet in a predetermined loading pattern thereon. In order to facilitate this operation or series of operations with a minimum movement and reorientation of the wrapped rolls, each wrapped roll is received, stopped, and clamped in a prepositioned tray or trough and simply upended about an axis parallel to the last mentioned predetermined path and onto an appropriately prepositioned pallet. This requires both a stepwise reciprocation of the upending tray or trough from one upending location to another along that predetermined path of travel of the wrapped rolls and, also, a stepwise, periodic, and preferably unidirectional advancement of a train or pallets transversely of that path and, most suitably, perpendicularly thereto; and both of these stepwise movements must be coordinated with each other and with the arrival of wrapped rolls and the upending of them onto the pallets.

Thus, all of the above-described operations and relationships are interrelated and coordinated so that each facilitates and cooperates with one or more of the others in achieving the overall result of wrapping and palletizing in a continuous automated manner.

DETAILED STRUCTURE AND OPERATION

Feeding section A (FIGS. 1–11)

Referring to FIGS. 1 through 10, a framework generally shown at 35 supports all of the apparatus of the feeding section A of the machine, and also of the wrapping section B. At the entrance end of the feeding section, a powered, roll-feeding conveyor includes two sets of inclined rollers 36 and 37 arranged to form a trough. One set only of the rollers is powered by an electric motor 38 (FIGS. 3 and 4), the motor being similarly inclined at an angle to the horizontal. A conventional chain 39 and sprocket arrangement is powered by the motor 38 and drives one of the rollers of the set 37, while a connecting chain 40 (FIG. 4) drives as many of the remaining rollers of that set as may be required.

Associated with the trough of conveyor rollers is an applicator for applying glue or other adhesive to an entering roll R, preferably as a continuous, narrow, strip or stripe. A countershaft 41 mounted for rotation beneath the roller set 37 (FIG. 4) is driven through a sprocket thereon by the chain 40. A belt 42, that is round in cross-section, is trained around a sheave 43 on the shaft 41 and drives a larger sheave 44 drivingly mounted on a shaft 45 that is journaled in a fixed bearing bracket 46. A lever, generally indicated at 47 (FIG. 5), pivots freely on the shaft 45 and includes a counterweighted arm 47a that is resiliently connected through a spring 48 to a solenoid-actuated piston 49. The other arm 47b of the lever 47 is bifurcated and straddles a glue wheel 50 mounted thereon for rotation so that downward actuation of the piston 49 raises the glue wheel with a yielding force against a roll R passing over the glue wheel in the trough of rollers thereabove. A belt 51 connects a pair of pulleys 52 and 53 which are in driven and driving relationship, respectively, with the sheave 44 and glue wheel 50, so that rotation of the sheave 44 also rotates the glue wheel 50.

FIG. 5 shows a normal, lowered position of the glue wheel 50 immersed in a pot 54 of paste or glue. The glue wheel is rotated continuously. When a roll R traveling along the trough of rollers is about to pass over the glue wheel, it engages a microswitch $L_1$ that is suitably and adjustably mounted on the framework 35 for energizing the solenoid of the piston 49 to raise the glue wheel a slight amount for engaging the roll as it moves axially, without rotation, along the roller trough, thus applying a straight strip or stripe of glue longitudinally along the surface of the roll. When the leading end of the roll R engages a second, similarly mounted microswitch $L_2$, the solenoid of the piston 49 is de-energized, allowing the glue wheel to descend by gravity and the piston 49 to rise as urged by the spring 48.

The roll R moves from the troughed rollers 36 and 37 onto similarly disposed sets of idler rollers 57 and 58 in a cradle E (FIG. 3). An adjustable stop mechanism, generally indicated at 55 (FIGS. 3, 7 and 10) and described below, is normally engaged by the loading end of the roll R to stop it on the cradle E.

The cradle E (FIG. 8) is mounted on a tilting frame, generally designated 56, for pivotally tilting the cradle in either of two directions; that is, either about a longitudinal axis toward the next section B of the machine as shown by the phantom lines of FIG. 9, or about a transverse axis to reject a roll as shown by the solid lines of FIG. 10. For these purposes, the cradle in which the sets of idler rollers 57 and 58 are journaled is provided with lugs 60 secured to fixed plates 61 by pivot pins 62, the latter serving as the longitudinal axis about which the cradle pivots. On the opposite side of the cradle E, a double-acting, fluid-actuated, piston and cylinder mechanism 63 is pivotally connected to the framework 35 by a collar 64 (FIG. 9) and has its piston rod pivotally attached to the cradle E for raising it to a dumping position (shown by the phantom lines of FIG. 9) and causing the roll R to roll from the cradle and down a ramp 66 toward the wrapping section B of the machine.

For tilting the cradle E about a transverse axis, the tilting frame 56 is also provided with depending ears 67 on opposite sides thereof (FIGS. 8, 9, and 10) which are pivotally mounted on posts of the main frame 35 by means of a transverse pivot shaft 69. The tilting frame 56 also includes a pair of spaced angle members 68 extending a considerable distance to the left, as viewed in FIGS. 3 and 10. These members support and are bridged by a pair of cross rollers 70 that are spaced along the angles 68 and over which an ejected roll may slide when the cradle is tilted on the shaft 69.

A supporting frame 71 for the adjustable stop mechanism 55 (FIGS. 6 and 10) is mounted between the angle members 68 for pivotal movement relative thereto by means of another transverse pivot shaft 72. The other end of the stop frame 71 is pivotally connected to a piston rod of a double-acting, fluid-actuated, reject dumping piston and cylinder mechanism 73 (FIG. 3) for separate and further tilting of the stop frame relative to the cradle and angle members 68.

The adjustable stop 55 includes a spring-loaded finger 74 pivoted near one end of an arm 75 that is journaled on a post 76 of the stop frame 71. A coil spring 77 urges the arm 75 in a counterclockwise direction as viewed in FIG. 10, so as to hold the opposite end of this arm against a stop member 78. The position of the spring-loaded finger is adjustable by a set screw 79, and movement of the finger when it is engaged by a roll moving onto the cradle E closes a microswitch $L_3$ for initiating what is normally the next movement of the cradle, i.e., tilting about a longitudinal axis toward the wrapping section B of the machine by extension of the piston and cylinder mechanism 63. However, if a roll R, while approaching the cradle E, appears to have been damaged or to be defective in any respect, the operator may push a reject button (not shown) to close a separate circuit (not shown) that controls the reject dumping piston and cylinder mechanism 73, causing it to retract and effect tilting of the cradle and its frame 56 about the transverse shaft 69 and to further lower the stop 55 and stop frame 71 by positively pulling the latter down to the position shown in FIG. 10. This permits the defective roll R to slide longitudinally out of the cradle on its rollers 57 and 58, over the stop 55, and over the pair of rollers 70 to any suitable receiver (not shown).

That dumping tilt of the cradle frame 56 is effected by gravity and is merely controlled by the retracting action of the piston and cylinder mechanism 73 until the angle members 68 reach their limit of tilt shown in solid lines in FIG. 10 and phantom outline in FIG. 3. At this point, these angle members engage and are stopped by a stop 80 on the main frame 35. Continued retraction of the piston and cylinder mechanism 73 permits the stop frame 71 to pivot about its pivot shaft 72 and swing further downwardly so as to lower the adjustable stop 55 out of the discharge path of the roll R. This lowering of the stop 55 is somewhat aided and extended by counterclockwise pivoting of the stop arm 75 as urged by the spring 77 and as permitted by swinging of the stop frame 71 away from the stop member 78. The same reject circuit may include any suitable reversing circuit for returning the reject piston and cylinrer mechanism back to its normal extended condition as soon as a rejected roll R has been discharged.

If rejection of a roll R is not initiated by intervention of an operator, as described, tripping of the microswitch $L_3$ by a roll R, as mentioned above, automatically initiates normal lateral tilting of the cradle E by which the roll R is rolled laterally onto the ramp 66 (FIG. 9) for travel to the wrapping section B now to be described.

*Wrapping section B (FIGS. 1, 2, and 11 through 19)*

The principal purpose of the wrapping section is to receive from the feeding section a roll R to which a strip of adhesive has been applied, encase the roll with a suitable wrapper to which a line of glue or the like has also been applied, and then to transfer the wrapped roll to the palletizing section C of the machine.

Referring to FIGS. 1, 2, and 11 through 19, a movable framework generally indicated at 85 supports the entire wrapping apparatus. To adjust for rolls R of various diameters, the framework 85 may be moved toward and away from the feeding section A, as indicated by the arrow $F_2$. In the form illustrated, the legs 86 of the framework move on rollers 87 and slotted guides 88 over beams 89 which parallel the sides of the framework 85. Turning of a threaded screw 90 carried in a bearing 91 on the main frame 35 drives a threaded nut (not shown) that is fixed to the movable framework 85 and translates the latter along the beams 89. This motion is accommodated by sliding of the lower end of the ramp 66 along a cooperating ramp on the movable framework 85, as hereinafter described.

A table top 92 atop the movable framework 85 overlies a vertically movable table 93 carrying a stack of sheets W of wrapping paper. The table 93 has a built up end 93a designed to elevate that end of the stack of wrapper sheets with respect to the rest of the stack. A cross arm 94 (FIG. 12) carries a plurality of hold-down knife edge fingers 95 which bear firmly down on the elevated end of the wrapper stack and hold the wrapper sheet on the top of the stack for engagement by an approaching roll R. These fingers 95 compress the stack of wrappers W only in their zones of engagement with the stack and are thus depressed slightly below the remainder of the top surface of the elevated end of the stack.

A series of four screw jack posts 96 (FIG. 13) support the vertically movable table 93 and engage nut members 97 mounted on an underslung beam 85a for rotation relative to the threaded posts 96. Each nut member 97 has an integral sprocket 98 around which a chain 99 is trained, and an electric motor 100, also carried by the movable framework 85, drives the chain 99 thorugh a drive sprocket 101.

At the forward end of the wrapping section (FIG. 11), a ramp 102 slidingly supports the discharge end of the delivery ramp 66 of the feeding section to form an extensible and contractible sloping surface along which an entering roll R may roll toward the wrapper stack W.

It will be noted that the glue wheel 50 in the feed section A applies a strip of glue at the bottom portion of the roll R and that this area is not touched by any of the sets of troughed rollers 36, 37, and 57, 58 in that section of the machine. By means of the threaded shaft 90 (FIG. 11), the position of the movable frame work 85 of the wrapping section B is so spaced from the feeding section A that the roll R makes one complete revolution in being discharged from the cradle E and rolling down the cooperating ramps 66 and 102 to reach the wrapper stack W. Thus, the glue strip on the roll does not touch anything until it reaches the stack W and engages the surface of the top wrapper along the near end thereof, except for the small portions thereof that are depressed by the hold-down knife fingers 95. This causes that end of the top wrapper to adhere to the roll R and tear itself free from the hold-down knife fingers as it is pulled upwardly by continued rolling of the roll R. As the roll R continues to roll, it wraps the top wrapper about itself in the process. The hold-down fingers hold the remainder of the stack and insure that only one wrapper at a time is picked up by a roll and wrapped about the roll.

Any suitable form of paste applicator is supported on the frame work 85 adjacent the trailing end of the wrapper stack W. One form of applicator may comprise (FIGS. 14 to 16) a paste or glue pot 103 and an underlying electric motor 104. By a sprocket and chain arrangement, generally indicated at 105, the motor 104 drives a continuous belt 106 around rollers 107 into and out of the glue pot 103, causing the belt 106 to acquire a coat of glue, then transversely across the movable table 93 and around a pulley 108 at the far side of the table, and finally back again to the glue pot 103. A bar 109 lies between the two parallel flights of the belt 106 and is attached to a long, generally horizontal arm of a first class lever 110 pivotally mounted to a cross beam 111, the other arm of the lever being pivotally connected to the movable core of a solenoid actuator 112 and being weighted or spring biased so that it tends to remain oriented as shown in FIG. 15.

In rolling over the ramp 102, the roll R trips the arm 182 of a microswitch $L_5$ (FIG. 11), energizing the solenoid of the solenoid actuator 112 and causing its core to thrust outwardly. This causes the arm 110 (FIGS. 14 through 16) to press the bottom flight of the continuous belt 106 against the trailing end of the topmost wrapper in the stack W so as to smear a strip of glue from the belt transversely across that end of the sheet. The tripping of limit switch $L_5$ may close a conventional time delay circuit (not shown), and after expiration of the resulting time delay, the solenoid of the actuator 112 is de-energized, and the parts actuated thereby return to their normal positions. It is to be understood that, if desired, time relay circuits can be employed with any limit switch herein described for the purpose of subsequently de-energizing its circuit instead of relying upon the actuation of a second associated limit switch to accomplish this purpose.

Obviously, other applicator means than that just described, such as one that applies glue from one or more spray guns, or an appropriately manipulated roller applicator, or the like (not shown) may be substituted as may be preferred.

For keeping the top level of the wrapper stack W from being excessively lowered as wrappers are used, a pivoted sensing finger 113 (FIG. 15) lies on the topmost wrapper in the stack by its own weight. As the stack is gradually depleted, the finger 113 gradually lowers until, upon reaching a predetermined minimum level, it closes an associated switch (not shown) that completes a circuit to the motor 100 for energizing that motor to raise the movable table 93. This raises the level of the stack and also of the sensing finger 113 until, upon reaching a predetermined maximum level, it reopens the same associated switch to stop the motor 100.

As indicated in phantom outline in FIG. 11, the table top 92 on which a roll R rolls during the wrapping operation is pivotally mounted to be swung upwardly for convenience in reloading this section of the machine with wrappers W when the supply of wrappers has been depleted.

Above the table top 92, a number of resilient hold-down strips 114 are fixed at one end thereof to an overhead cross bar 115 and are positioned to flex as shown (FIG. 11) and exert a wrapper-smoothing, hold-down pressure on the partially applied wrapper. The table top 92 (or 119 hereinafter described) is made long enough for the wrapping of the roll R to be completed thereon by rolling of the partially wrapped roll over the glued surface along the trailing end of the wrapper so as to bring it into overlapping relationship with the opposite end thereof and press the two overlapped ends of the wrapper into firm adhesion before the fully wrapped roll R reaches and rolls down a discharge ramp 120.

FIGS. 17 through 19 illustrate a modified portion of the wrapping section of the machine for directing a roll through the initial phases of the wrapping operation. This modification is designed to stop and assure proper alignment of each roll R on the fixed table so that its longitudinal axis is disposed at a true right angle to its desired direction of travel. It is also designed to lower the roll R into adhesive engagement with the leading end of the top wrapper W in the wrapper stack while the roll is stopped in proper alignment with the wrapper stack.

In the modified form of apparatus illustrated, a movable tray 116 is shaped to form a nesting zone for a roll R. The shelf is fixed at one edge to a pivot shaft 117 suitably journaled at opposite sides of the framework 85 and extending across and slightly above the wrapper stack. Beyond one edge of the framework 85, an arm extension 116a from the tray 116 is pivotally connected to the piston rod of a double-acting, fluid-actuated, piston and cylinder mechanism 118. As the tray 116 receives a roll from an extension 102a of the ramp 66 (FIG. 17), the cylinder 118 extends to move the tray slightly in a counterclockwise direction about the pivot shaft 117, as viewed in the drawings, so as to lower the glue strip or stripe on the roll into engagement with the topmost wrapper of the stack. The bottom of the tray is cut away for this purpose, as shown, permitting the entire weight of the roll to aid in securing firm contact with the wrapper and adhesion of the wrapper to the glue on the roll. Thereupon, the piston and cylinder mechanism 118 retracts to pivot the tray 116 in the opposite direction (FIG. 19) sufficiently to restart the rolling movement of the roll R along a slightly inclined, fixed ramp or table top 119 that corresponds to the table top 92 in the other illustrated form of wrapper structure previously described. During its continued rolling movement, the roll R pulls along and wraps itself in the wrapper adhered thereto. In all other respects, the wrapper structure and its operation are the same using either of the illustrated and described structures for adhering the leading end of a wrapper W to a roll R.

The discharge ramp 120 leads to the palletizing section C of the machine, next to be described, and engages it with a sliding action to accommodate horizontal adjustment of the position of the movable frame 85 of the wrapping section B and reciprocation of a carriage that receives, positions, and palletizes the wrapped rolls in the palletizing section C of the machine.

*Palletizing section C (FIGS. 1, 2, and 29 through 30)*

The principal purpose of the palletizing section C is to receive the wrapped rolls from the discharge ramp 120 of the wrapper section B and upend them in rows in one or more patterns upon a pallet, while periodically moving the pallet stepwise as each row is completed to enable the pallet to receive an additional row of upended, wrapped rolls. A succession of pallets is so advanced and loaded one after another without interruption by moving an empty pallet into loading position as a fully loaded pallet is moved away.

Referring to FIGS. 1, 2, and 21 through 30, the palletizing section C includes a carriage assembly, generally indicated at 125, which is adapted to receive the wrapped rolls, upend them, and position them on end in rows on a pallet P to the left of the carriage assembly as viewed in FIG. 20. Meanwhile, in accordance with the demands of the palletizing operation, a succession of pallets is advanced beneath the carriage assembly 125 for continuously receiving its output.

More particularly, the carriage assembly 125 (FIGS. 2, 20, and 22-24) is adapted to travel on wheels 126 along tracks 127. A plate 128 is pivoted at one end on the upper ends of a pair of posts 129 (FIG. 23) on the carriage 125 and provides a horizontal extension of the discharge ramp 120 of the wrapping section B of the machine. The opposite end of the plate 128 rests on another portion of the main frame 35 for sliding movement thereon while slidingly supporting the lower end of the discharge ramp 120 to permit horizontal adjusting movement of the wrapping section frame 85, as described above, and also to permit elongate and retraction of the ramp extension as the carriage 125 travels back and forth on its tracks 127.

The plate 128 supports a wrapped roll as it rolls from the ramp 120 toward and into an upending tray or trough 130 (FIGS. 2 and 23) mounted on a tilting frame 131 of the carriage 125, where the roll is held by associated gripping means while being upended and released at one of a series of discharge locations. Upon being seated in the tray 130, the roll trips a microswitch $L_6$ to activate the sequence of roll gripping, upending, and releasing operations controlled by additional microswitches or limit switches (not shown) appropriately positioned and wired into conventional circuitry.

In the form shown, the gripping means includes a double-acting, fluid-actuated piston and cylinder mechanism 132 (FIG. 22) mounted on the tilting frame 131 for actuating a parallel motion linkage 133 to thrust a padded head 134a of a ram 134 against one end of a roll R on the tray and push it against a pivotally mounted lip 135 that is normally held in the position shown in FIGS. 22 and 23 by another double-acting, fluid-actuated, piston and cylinder mechanism 136.

Another double-acting, fluid-actuated, piston and cylinder mechanism 137 propels the carriage 125 in a stepwise manner back and forth on the tracks 127. Still another double-acting, fluid-actuated, piston and cylinder mechanism 138 pivots the tilting frame 131, its tray 130, and the associated gripping mechanism to the upstanding position shown in FIG. 24 by applying a force against side arms 139 fixed to the frame 131 and pivotally mounted on a shaft 140 to the carriage 125.

When the tray 130 has received a wrapped roll WR and the microswitch $L_6$ has been tripped, the roll is clamped endwise by contraction of the piston and cylinder mechanism 132 to push the wrapped roll tightly against the lip 135. Thereupon, the piston and cylinder mechanism 138 extends to tilt the tilting frame 131 and its tray to the upright position shown in FIG. 24, thus locating the wrapped roll over the proper spot on a pallet P and only slightly above the pallet. The wrapped roll is then released to drop and rest on end on the pallet by contraction of the piston and cylinder mechanism 136 to pull the lip 135 out from under the roll. Reverse movement of the piston and cylinder mechanisms 132, 136, and 138 then returns the tray and its associated gripping mechanism to their original positions. This trips a microswitch $L_7$ to initiate the next operation in which the piston and cylinder mechanism 137 extends or retracts to position the carriage for receiving and palletizing the next wrapped roll discharged from the wrapping section.

FIGURE 29 schematically illustrates part of a control means for controlling the stepwise movement of the carriage 125 along the tracks 127 and stopping at successive roll unloading positions during both outward and return travel of the carriage. A control arm 141 may be mounted on and extend from the carriage 125 and carry a series of balls 142a through 142g threaded on the arm like beads and welded in properly spaced relationship or held by set screws for sequentially tripping a microswitch $L_8$ mounted on the frame 35 as the arm reciprocates with the carriage. Each of these balls may determine one of a corresponding number of positions of the carriage 125 at which it may be desired to stop the carriage for upending a roll R and depositing it on a pallet according to one of a number of alternative pallet loading patterns. Two examples of such patterns are shown in FIGS. 30 and 31, and each of the seven balls 142a through 142g may correspond in position (relative to the others) to one of the total of seven positions in the staggered pattern of FIG. 30, or only four balls may be used, each corresponding in position (relative to the others) to one of a total of only four positions in each row of the non-staggered pattern of FIG. 31. By adjusting the number and positions of the balls on the arm 141, the same switch system may be employed for determining the smaller number of positions of the carriage required to deposit a smaller number of large rolls on pallets according to the uniform or even pattern of FIG. 31.

By way of example of such use of the balls 142a through 142g, the microswitch $L_8$ may be wired through a circuit that is energized by a properly programmed step switch or in response to a combination of carriage position and pallet position conditions so that the circuit is energized and the microswitch $L_8$ is operative only when the first, third, fifth, and seventh balls 142a, c, e, and g are closely approaching the switch L₈ while palletizing a four roll row and only while the intermediate balls 142b, d and f are closely approaching the switch L₈ while palletizing a three roll row.

Whatever the loading pattern, the carriage is moved stepwise in one direction, stopping only at each roll discharge position for a particular row of a particular palletizing pattern, and, after a one step advance of the pallets as hereinafter described, the procedure is then repeated for the next row of that pattern with the carriage moving stepwise in the opposite direction.

A pallet feeder holds a stack S of pallets P in a magazine M and is adapted for sequentially feeding pallets one at a time from the bottom of the stack onto a roller type pallet conveyor 143 (FIGS. 20 and 21) which extends from under the pallet feeder to beneath and well beyond the carriage assembly 125. The magazine M supports the stack of pallets in such a manner (hereinafter described) that, on demand, it can release the bottom pallet onto the conveyor 143 for travel along the conveyor.

Referring to the pallet feeder in more detail, it comprises a magazine frame 144 that houses a series of conventional pallets P laid atop one another with their open sides or edges facing toward and away from one viewing the apparatus as shown in FIG. 20. Adjacent both of these open sides of the stacked pallets (FIGS. 25 through 27), pairs of laterally spaced, vertically disposed, lifting arms 145 are mounted on the frame 144, each of these four arms having an inturned lip 145a at its upper end. Each arm 145 is pivotally connected at its lower end to a ballcrank lever 146 comprising a pair of spaced triangular plates 146a that are fixed to a pivot shaft 147a on one side or 147b on the other side of the frame 144.

Each bellcrank lever 146 includes a spring-loaded control device, generally designated 148, designed to control the action of the associated arm 145 relative to its bellcrank 146 with a spring-biasing action that opposes relative pivoting thereof in either direction from a neutral relationship (FIGS. 26–28). This control device 148 includes (FIG. 28) a cylinder 149 having a fixed collar 150 by which the device is pivotally connected between and to the spaced arms of its bellcrank lever 146. A rod 151 is threaded at both ends and extends through the cylinder 149. This rod has an opening 152 at its upper end by which it is pivotally connected to its associated lifting arm 145. A compression spring 153 within the cylinder 149 encircles the rod 151. At each end of the cylinder 149, a flanged sleeve 154 bears against the spring 153, and nuts 155 are adjustably threaded on the ends of the rod 151 into engagement with the respective sleeve 154 so that axial movement of the rod 151 in either direction relative to the cylinder 149 causes one of the nuts, acting through an intervening sleeve 154, to compress the spring 153.

A pair of links 156 on opposite sides of the frame 144 respectively pivotally interconnect opposite pairs of the bellcrank levers 146 to constrain all of them and their shaft mounting 147a and 147b to pivot together, the bellcranks of each opposite pair pivoting in opposite directions as viewed in FIG. 25. A double-acting, fluid-actuated, piston and cylinder mechanism 157 mounted on one side of the frame 144, turns one of the pivot shafts 147b through an interconnecting arm 158 fixed thereto and pivotally joined to the piston rod of this piston and cylinder mechanism.

A stack S of pallets P in the magazine M is suitably guided by vertical members of the frame 144 for vertical sliding movement and is normally supported therein by the lips 145a of the four arms 145 while these arms are positioned as shown in FIG. 25 (in which an additional pallet already released from the bottom of the stack is shown resting on the conveyor 143). As shown, the arm lips 145a project into the open ends of the lowermost pallet of the supported pallet stack and bear against the underside of the platform of that pallet for supporting the stack.

When the previously released pallet has been moved away along the conveyor 143, the pallet feeding mechanism described above is actuated by the piston and cylinder mechanism 157 to lower the pallet stack S until it rests on the conveyor and then to raise all but the bottommost pallet so as to free the latter for movement along the conveyor. This actuation is effected by extension of the piston and cylinder mechanism 157 so as to rotate all four bellcranks 146 and thereby lower their respective pallet stack supporting arms 145. At the beginning of this movement of the bellcranks, the control device 148 of each is biased so that the rod 151 thereof is held downwardly relative to the cylinder 149 (as shown in FIGS. 25 and 27) by the attitude of the arm 145, which is held vertical against a stop member 159 on the frame 144 by the reactive force of the control device. During movement of the bellcranks toward their positions shown in phantom outline for one bellcrank in FIG. 27, the attitude of the arms 145 remains vertical as they also are lowered, and the initial bias of each control device is gradually relieved until it passes beyond its dead center condition shown in FIG. 28 and then becomes gradually biased more and more in the opposite direction until it reaches its phantom outline position in FIG. 27, but with its arm 145 still held in its vertical attitude by frictional engagement of its lip 145a with the bottommost pallet of the supported stack. When the arms 145 have been so lowered to the point where the weight of the pallet stack is transferred to the conveyor 143, the lip 145a of each arm 145 is no longer held by such friction, and the arm swings outwardly to its phantom outline position in FIG. 27 as urged by the spring of the control device. This outward swinging of each arm 145 is stopped by engagement of the upper end of the arm against a vertical surface of the frame 144 at a point at which the control device has returned substantially to its dead center condition. At this point, the entire stack S of pallets rests on the conveyor 143, and the arms 145 are tilted laterally completely out of engagement with the pallets in a position to be raised for engaging the second pallet from the bottom for lifting it and the pallets above it upwardly to the condition shown in FIG. 25, thereby leaving a single pallet P resting on and free to be advanced along the conveyor 143.

Upward movement of the arms 145 for the last stated purpose is initiated immediately after the mechanism has reached the condition shown in phantom outline in FIG. 27 by reversal of the piston and cylinder mechanism 157 so that it contracts and reverses the pivotal movement of the bellcranks 146. As this reverse movement of the parts progresses, any slight remaining bias of the control device 148 is almost immediately dissipated and continuation of this reverse movement causes the arms 145 to be swung by the bellcranks back to their vertical attitudes while being raised enough for their lips 145a to rise above the bottommost pallet on the conveyor and move inwardly into supporting relationship with the underside of the platform of the next higher pallet (as illustrated in FIG. 27 by the phantom outline of a lip 145a after it has moved inwardly and before being further raised as indicated by an arrow 145b). This inward swinging of the arms 145 is stopped by the stop member 159 on the frame 144 while the bellcranks continue moving in their arm-raising directions. During the final arm raising stage of the operation toward the final position of the parts shown in FIG. 25, there is a relative pivotal movement of each arm and its bellcrank which re-biases the control device 148 back to its first described downwardly biased condition shown in FIGS. 25 and 27. In this condition and while the parts are approaching it, such bias of the control device urges the arms inwardly, but inward swinging thereof is restrained by the stop member 159.

Advancement of the train of pallets P along the conveyor 143 from the pallet magazine M is effected by a double-acting, fluid-actuated, piston and cylinder mechanism 160. The cylinder of this mechanism 160 is suitably mounted on the conveyor frame below the conveyor rollers (FIGS. 20 and 21), and the piston extends and is rigidly secured to a depending plate 161 carried by a trolley 162. The trolley 162 travels on wheels 163 riding in longitudinally extending channel beams 164 of the conveyor frame and carries a pivotally mounted lever 165 that is urged upwardly by a spring 166. The lever 165 has a hooked end 165a which catches on the trailing side of a pallet P for advancing that pallet as the trolley travels to the left in FIG. 21 in a stepwise manner. Each pallet so advanced pushes all pallets ahead of it in the same stepwise manner.

The palletizing apparatus also includes an automatic control mechanism for effecting reciprocation of the trolley 162 by the piston and cylinder mechanism 160. This comprises a continuous cable 167 (FIGS. 20, 25, and 32) trained about an upper pulley 168 mounted adjacent the top of the far end of the frame 144 of the pallet magazine. A counterweighted arm 169 (FIG. 25) urges the pulley 168 upwardly to maintain the cable 167 in a taut condition. One reach 167a of the cable 167 extends from the pulley 168 vertically down and around a lower pulley 170 (FIG. 32), then horizontally beneath the trolley 162 and the cylinder 160 to a forward pulley 171 mounted on the conveyor frame (FIG. 21). A return reach 167b of the cable extends from the forward pulley 171 back to a lower pulley 172 on the magazine frame 144. En route to the lower pulley 172, the return reach of the cable is clamped at 173 to the depending plate 161 that rigidly connects the trolley 162 to the piston rod of the piston and cylinder mechanism 160. From the lower pulley 172, the return reach 167b of the cable 167 runs vertically upwardly to the first mentioned upper pulley 168 (FIG. 32). It may thus be seen that extension and retraction of the piston and cylinder mechanism 160 for reciprocating the trolley 162 also causes the cable 167 to reciprocate along its path of travel just described.

The return reach 167b of the cable 167 may have a lug 174 secured thereon for tripping a series of limit switches $L_9$ through $L_{15}$, which may be suitably mounted on a vertical plate 175 that is in turn mounted on the frame 144 or base of the pallet magazine (FIGS. 20 and 32). The limit switches $L_9$ through $L_{15}$ are mounted on the vertical plate 175 for vertical adjustment of their spacing and so as to be contacted by the lug 174 at appropriate intervals during the cycle of operation of the piston and cylinder mechanism 160. The end limit switches $L_9$ and $L_{15}$ may be interconnected through suitable, conventional circuitry in a well known manner for reversing the action of the piston and cylinder mechanism 160 at each end of its stroke. The intermediate switches $L_{10}$ through $L_{14}$ may be wired to a master switch (not shown) by which the desired stepwise retraction of the piston and cylinder mechanism 160 may be controlled in a well known manner for effecting the stepwise advancement of the pallets along the conveyor 143.

This control scheme and that for controlling the stepwise movement of the palletizing carriage 125 may, with only obvious circuitry changes, be substituted one for the other for either purpose.

After stepwise contraction of the piston and cylinder mechanism 160 for advancing a series of pallets for a total distance of slightly more than the length of one pallet along the conveyor 143, the limit switch $L_{15}$ is tripped for immediately reversing and extending the piston and cylinder mechanism to push the trolley 162 rearwardly in one stroke until the hook 165a on the arm 165 engages behind the trailing edge of a pallet P in the pallet magazine M that has been released from the bottom of the pallet stack S as previously described. It is at this point that the limit switch $L_9$ is tripped for again reversing the piston and cylinder mechanism 160 and causing it to contract stepwise for pulling the last engaged pallet forwardly into engagement with the pallets ahead of it on the conveyor and advancing the series of pallets in the desired stepwise manner. As will be apparent, the amount of incremental advance of the series of pallets in this manner is determined by the spacing of the limit switches $L_9$–$L_{15}$ on the vertical plate 175, which, with one exception, corresponds to the center-to-center spacing of successive rows of wrapped rolls to be deposited on a pallet by the palletizing mechanism previously described. This spacing will vary according to the selected pattern of disposition of wrapped rolls on the pallets by the palletizing mechanism, two such patterns being shown in FIGS. 30 and 31 as mentioned above. The one exception is that the first stepwise movement of a just released pallet is greater than a one step advance of the pallet train by the space shown in FIG. 21 between the rear of the pallet train and the next pallet ready to be pulled from the magazine M after being lowered from the stack S.

SUMMARY OF OPERATION

A roll R of roofing paper or the like is set in the trough formed by the rolls 36 and 37 of the feeding section A of the machine. This may be done in any desired manner, as by pushing the roll endwise along the axis of the trough in the direction of the arrow $F_1$ or by rolling it into the trough from a direction transverse to that axis so that a portion of the roll rests on one or more of the rolls in the driven set 37 that are driven by the motor 38. This propels the roll R axially, without rotation about its own axis, toward the cradle E. Additional rolls R are set in the same roller trough one after another and are identically handled, unless rejected as described below, at any desired rate up to the maximum capacity of the palletizing section C of the machine to handle the wrapped rolls WR.

As each roll R moves toward the cradle E, the microswitch $L_1$, is engaged and tripped by the leading end of the roll energizing the solenoid that actuates the piston 49 and causes the lever 47 to rock and raise the rotating glue wheel 50 into engagement with the side of the roll at its leading edge. The glue wheel 50 is held in glue applying relationship with the roll as it continues to move toward and onto the cradle E and until a glue strip or stripe has been applied over the full length of the roll. At this point, the leading end of the roll engages and trips the second microswitch $L_2$ for de-energizing the solenoid of the piston 49, allowing the piston to retract and the glue wheel to lower by gravity in the glue pot 54.

An operator watching the rolls R as they are fed one after another over the troughed rollers 36 and 37 may occasionally detect a defective roll, such as one on which the outer turn of the roofing paper is torn. As that roll is approaching the cradle E, he may press a reject button to momentarily disable the circuit that controls the previously described, normal, lateral tilting action of the cradle and to energize a circuit for retracting the reject piston and cylinder mechanism 73. This allows the cradle and the entire tilting frame 56 to lower by gravity about the transverse pivot shaft 69 into engagement with the stop 80 (FIG. 10), and the reject piston and cylinder mechanism 73 continues to retract and pull the stop frame 71 and stop mechanism 55 still further downwardly so as to drop the stop finger 74 out of the path of the defective roll R as it continues its endwise travel by gravity over the idler rollers 57 and 58 of the downwardly tilted cradle and over the reject rollers 70 beyond the cradle to any suitable receiver for rejected rolls. Thereupon the reject piston and cylinder mechanism extends and returns the tilting frame 56 and stop frame 71 back to their normal raised positions.

Except as a defective roll R may now and then be rejected as described, one roll after another, is moved along at intervals by the inclined drive rollers 37 while having glue applied thereto, rides smoothly over the troughed sets of idler rollers 57 and 58 of the cradle E until it engages, actuates, and is stopped by the stop finger 55. This trips the limit switch $L_3$, which initiates extension of the piston and cylinder mechanism 63, causing the cradle to tilt laterally as shown in FIGURE 9 and roll the roll R down the ramp 66 and its adjustable extension 102 of the wrapping section B of the machine.

For adjusting the feeder section A of the machine to handle rolls R of different diameters, all that is required is to adjust the projecting length of the actuator fingers on the microswitch $L_1$ and $L_2$, as indicated by the showing of rolls of two illustrative diameters in FIGURE 4. While the particular machine shown is designed to handle only a single standard length of roofing paper roll, it will be apparent that the glue applying and roll feeding portion of this section of the machine could if desired, be mounted for adjustable movement toward and away from the cradle E. In that case, only a corresponding adjustment of the positions of the microswitches $L_1$ and $L_2$ along their mounting bar and of the stop mechanism 55 on the stop frame 71 would also be required for rolls R of different lengths to be accommodated and stopped in a lengthwise centered position on the cradle E.

As previously indicated, the wrapping section B of the machine is adjusted toward or away from the feeding section A as required so that a roll R will rotate exactly 360° during tilting of the cradle E and rolling of the roll out of the cradle and along the slidingly self-adjusting ramp portions 66 and 102 to the wrapper pick-up position in the wrapping section B of the machine. As also previously pointed out, the microswitch $L_5$ mounted on the ramp extension 102 is tripped by the roll R as it moves along the ramp to initiate action of the glue applicator at the discharge end of the wrapping table for applying a strip of glue along the surface of the top wrapper W in the wrapper stack adjacent the trailing edge of the wrapper.

Thus, the glue strip or stripe applied to the roller R in the feeding section A of the machine is brought into engagement with the leading edge portion of the top wrapper and adheres it to the roll R. This occurs either while the roll R is rolling through the first described embodiment of the wrapping section (FIGS. 11–16) or while it is momentarily stopped at the wrapper pick-up station by the realigning mechanism of FIGS. 17–19. In either case, as the roll R rolls beyond the pick-up station, it tears the adhered leading edge portion of the top wrapper W loose from the hold-down fingers 95 and pulls it over and around the roll R as it rolls, leaving the rest of the stack of wrapper sheets still held down by the hold-down fingers. At the end of the second full revolution of the roll R from the initial roll-feeding path of the feeding section A of the machine, the previously glued trailing edge portion of the top wrapper sheet W overlaps and engages the leading edge portion thereof first picked up by the roll and is adhered thereto to complete the wrapping operation while the wrapped roll WR continues to roll off the discharge end of the wrapping table and down the discharge ramp 120 to the palletizing section C of the machine.

Since the stack of wrappers W is automatically raised at intervals in response to the action of the sensing finger 113, the operation of the wrapping section B of the machine may continue until the wrappers in the stack are exhausted and must be replenished.

When a wrapped roll WR is discharged from the wrapping section of the machine as just described, the carriage assembly 125 of the palletizing section C of the machine is stationary and may be in any one of its several palletizing positions required for the particular pallet loading pattern being followed. The plate 128, which moves as a part of the carriage assembly 125 in sliding engagement with the ramp 120, provides a self-adjusting extension of the ramp 120 on which the wrapped roll WR continues to roll until it drops into the carriage tray or trough 130.

This trips the microswitch $L_6$ on the far side of the tray 130 (FIGS. 22–24) and initiates the sequence of operations by which the wrapped roll is gripped endwise between the padded head 134a of the ram 134 and the retractible lip 135 is upended over a waiting pallet P (which may be empty or in any stage of being loaded) at the proper location with respect thereto, and is released to rest on end on the pallet. When the wrapped roll is released, the tray 130 immediately returns to its horizontal, roll-receiving position, thereby tripping the microswitch $L_7$ and initiating travel of the carriage assembly to the next palletizing position as determined by the programmed functions of the microswitch $L_8$ and the tripping thereof by the appropriate one of the balls 142a–142g on the control arm 141.

This sequence of operations of the carriage assembly 125 is repeated for each of a continuous series of wrapped rolls WR arriving at intervals at the palletizing section C of the machine until a pallet P is completely loaded according to the loading pattern employed (e.g., as shown in FIG. 30 or FIG. 31).

Depending upon the loading pattern and the number of rows of wrapped rolls WR placed on a single pallet P, the first row to be placed on the next pallet may involve a mere continuation of the pattern for the pallet previously loaded or may involve a pattern discontinuity, as when the patterns for the first and last rows placed on a pallet are identical but the patterns for the intermediate rows alternate in a predetermined manner (e.g., as shown in FIG. 30).

The operation of the pallet feeding portion of the palletizing section C of the machine is suitably interlocked with the operation of the carriage assembly 125 by the use of additional microswitches and conventional electrical circuitry so that the continuous train of pallets P is advanced one step (by a distance equal to the center-to-center spacing of successive rows of wrapped rolls in the loading pattern employed) each time the carriage assembly has completed the placing of a row of wrapped rolls on a pallet (involving stepwise movement of the carriage in one direction) and is ready to start placing the next row (involving stepwise movement of the carriage in the opposite direction). When one pallet has been fully loaded, it and its load are pushed away by the next pallet being advanced into position to receive its first row of wrapped rolls.

As already sufficiently described, the spring biased lever 165 of the pallet feeder pulls the last pallet in the pallet train in a stepwise manner to the position shown in FIG. 21, and the next pallet P is then lowered onto the channel beams 164 of the pallet conveyor 143 from the pallet stack S in the pallet magazine M. Thereupon the stepwise retraction of the actuating piston and cylinder mechanism 160 is instantly reversed to project the lever hook 165a in one continuous movement behind the last lowered pallet P in the magazine in readiness for the next stepwise advance of the pallet train.

As the stack S of pallets P in the magazine M is depleted, additional pallets may be loaded into it at an upper side portion of the magazine left open for that purpose. As is the case throughout the machine where different operations must be coordinated, the pallet lowering mechanism of the pallet magazine is coordinated with the advancement of the pallet train by the use of additional microswitches and conventional electrical circuitry.

As will be apparent from the foregoing, the entire machine for feeding, wrapping, and palletizing cylindrical objects is fully automatic throughout, except for the duty of an operator to watch incoming objects and operate a reject button for rejecting any incoming roll R that may be defective, and except for the need to add pallets to the stack S in the magazine M from time to time while the machine is operating. As indicated above, the machine can run continuously until the wrappers W in the wrapper stack in the wrapping section B of the machine are exhausted, and only a brief shutdown is required for replenishing the wrapper stack if this should be required during any normal period of operation.

While the invention has been described and illustrated herein with reference to specific structures, mechanisms and controls, these are merely illustrative. As will be apparent to one skilled in the art, the invention may be practiced other than as specifically disclosed.

What is claimed is:

1. Wrapping and palletizing apparatus for cylindrical articles, comprising conveyor means for translating said articles, without rotation, axially one after another along a first predetermined path to a transfer station; means for applying adhesive longitudinally of each article along a predetermined line on the surface thereof as it moves along said first path; an inclined ramp at said transfer station sloping downwardly and outwardly in a direction transverse to said first path to a wrapping zone; transfer means at said transfer station for receiving each article as it arrives and for rolling it down said ramp along a second predetermined path extending in said direction transverse to said first path to and through said wrapping zone; means in said wrapping zone for supporting each article for continued rolling along said second path, and additional means in said wrapping zone for engaging a wrapper with said adhesive on each article to effect wrapping of the article as it rolls through said wrapping zone to a discharge station for wrapped articles; and an article-upending mechanism having an article-receiving trough oriented parallel to articles rolling along said second predetermined path for receiving wrapped articles one at a time as they arrive at said discharge station, said article-upending mechanism including means actuatable for upending the trough and a wrapped article therein by rotation of the trough and article about an axis parallel to said second predetermined path for spotting the upended wrapped article on a receiving surface.

2. Apparatus according to claim 1 in which said additional means in said wrapping zone comprises means for holding a stack of wrappers a predetermined distance along said second path from said transfer station with the surface of the stack along an edge of the stack nearest said transfer station exposed and constituting a pick-up station for engagement of wrappers with the adhesive on said articles rolled down said ramp so that each article may pick up the top wrapper in the stack and wrap itself therein while rolling further along said second predetermined path beyond said pick-up station to said discharge station.

3. Apparatus according to claim 1 in which said additional means in said wrapping zone comprises means for holding a stack of wrappers a predetermined distance along said second path from said transfer station with the surface of the stack along an edge of the stack nearest said transfer station exposed and constituting a pick-up station for engagement of wrappers with the adhesive on said articles rolled down said ramp so that each article may pick up the top wrapper in the stack and wrap itself therein while rolling further along said second predetermined path beyond said pick-up station to said discharge station, and at least one finger compressing said stack adjacent said edge thereof so as to release only the top wrapper of the stack when torn loose by adhesion to and lifting by an article moving through said wrapping zone.

4. Apparatus according to claim 1 in which said ramp is extensible and retractible by adjustment of the spacing of said wrapping zone from said transfer station.

5. Wrapping and palletizing apparatus for cylindrical articles, comprising conveyor means for translating said articles, without rotation, axially one after another along a first predetermined path to a transfer station; means for applying adhesive longitudinally of each article along a predetermined line on the surface thereof as it moves along said first path; an inclined ramp at said transfer station sloping downwardly and outwardly in a direction transverse to said first path to a wrapping zone; transfer means at said transfer station for receiving each article as it arrives and rolling it down said ramp along a second predetermined path extending in said direction transverse to said first path to and through said wrapping zone; means in said wrapping zone for supporting each article for continued rolling along said second path, means in said wrapping zone for engaging one end of a wrapper with said adhesive on each article to effect wrapping of the article as it rolls through said wrapping zone to a discharge station for wrapped articles; and an article-upending mechanism having an article-receiving trough oriented parallel to articles rolling along said second predetermined path, said trough being mounted for translation toward and away from said discharge station along an article-spotting reach extending further along said second predetermined path to a sequence of dumping points spaced along said article-spotting reach, said article-upending mechanism including means actuatable upon arrival of said trough at any predetermined one of said dumping points for upending the trough and a wrapped article therein by rotation about an axis parallel to said spotting reach for spotting the upended wrapped article on a receiving surface.

6. Wrapping and palletizing apparatus for cylindrical articles, comprising conveyor means for translating said articles, without rotation, axially one after another along a first predetermined path to a transfer station; means for applying adhesive longitudinally of each article along a predetermined line on the surface thereof as it moves along said path; an inclined ramp at said transfer station sloping downwardly and outwardly in a direction transverse to said first path; transfer means at said transfer station for receiving each article as it arrives and rolling it down said ramp along a second predetermined path extending in said direction transverse to said first path; means for holding a stack of wrappers a predetermined distance along said second path from said transfer station with the surface of the stack along an edge of the stack nearest said transfer station exposed and constituting a pick-up station for engagement of wrappers with the adhesive on articles rolled down said ramp so that each article may pick up the top wrapper in the stack and wrap itself therein while rolling further along said second predetermined path beyond said pick-up station to a discharge station for wrapped articles, and means providing a supporting surface on which articles may roll further along said second predetermined path from said pick-up station to said discharge station while being wrapped; and an article-upending mechanism having an article-receiving trough oriented parallel to articles rolling along said second predetermined path, said trough being mounted for translation toward and away from said discharge station along an article-spotting reach extending further along said second predetermined path to a sequence of dumping points spaced along said article-spotting reach, said article-upending mechanism including means actuatable upon arrival of said trough at any predetermined one of said dumping points for upending the trough and a wrapped article therein by rotation about an axis parallel to said spotting reach for spotting the upended wrapped article on a receiving surface.

7. Wrapping and palletizing apparatus for cylindrical articles, comprising:

(a) conveyor means for translating said articles, without rotation, axially one after another along a first predetermined path to a transfer station, means for applying adhesive longitudinally of each article along a predetermined line on the surface thereof as it moves along said first path, and transfer means at said transfer station for receiving each article as it arrives and starting it rolling along a second predetermined path extending transversely to said first path to and through a wrapping zone;

(b) wrapping apparatus defining said wrapping zone and including means for supporting each article while rolling through said wrapping zone along said second path to a discharge station for wrapped articles, and additional means for engaging a wrapper with said adhesive on each article to effect wrapping of the article as it rolls through said wrapping zone;

(c) an article-upending mechanism having an article-receiving trough oriented parallel to articles rolling along said second predetermined path for receiving wrapped articles one at a time as they are discharged from said discharge station, said article-upending mechanism including means actuatable for upending the trough and a wrapped article therein by rotation of the trough and article about an axis parallel to said second predetermined path for spotting the upended wrapped article on a receiving surface;

(d) an extensible ramp bridging from said transfer means to said wrapping apparatus for extending and retracting in response to adjusting movement of said wrapping apparatus toward and away from said transfer means; and (e) a second extensible ramp bridging from said discharge station to said article-receiving trough for extension and retraction in response to movement of said trough toward and away from said discharge station, whereby said trough, while positioned at any of a sequence of upending stations along said second predetermined path, may receive a wrapped article rolling along said second ramp from said discharge station.

8. Apparatus for wrapping cylindrical articles comprising an inclined first support on which said articles may roll downwardly to a wrapper pick-up zone; means for supporting a stack of wrappers with the top wrapper of the stack disposed generally below the level of articles rolling on said first support, but with the top surface of said top wrapper adjacent one edge thereof disposed for engagement by articles arriving at said pick-up zone; and a second support disposed below said first support to provide rolling support for said articles beyond said pick-up zone and over but spaced from said wrapper stack; whereby adhesion of the top wrapper of said stack to an article in said pick-up zone will enable the article to pull the top wrapper from the stack and wrap itself therein while rolling by its own momentum along said second support, a tiltable tray mounted between said first and second supports in said pick-up zone for receiving articles discharged from said first support to said pick-up zone, said tray being upwardly convex and conforming generally to the cylindrical contour of said articles so that said articles nest therein with a predetermined orientation when received thereby, and means for tilting said tray to start said articles rolling along said second support in a direction controlled by the orientation of said articles when nested in said tray.

9. A wrapping and palletizing apparatus for cylindrical articles comprising:

(a) a wrapping apparatus including a first inclined ramp with its lower end adjacent to a wrapping location, transfer means operable to position articles at the upper end of said first ramp so that they roll down to said wrapping location along a first path normal to their cylindrical axes, said wrapping apparatus providing first means at said wrapping location supplying wrapping material having an edge engaged by a longitudinal portion of an article at said wrapping location, said wrapping apparatus providing second means to apply adhesive between said edge and said longitudinal portion so that said edge is adhesively bonded to said longitudinal portion, said wrapping apparatus providing third means at said wrapping location to cause rotation of said article about said cylindrical axis to cause said article to be wrapped by said wrapping material after said edge is adhesively bonded thereto, said wrapping apparatus also including a second inclined ramp along which said wrapped articles roll along a second path to a discharge zone at said palletizing apparatus, said cylindrical axis of said articles remaining in a fixed orientation as said articles move through said wrapping apparatus, (b) palletizing apparatus adapted to receive the rolling articles one at a time and including turning means effective to receive and engage the ends of a wrapped article and upend and deposit it on a pallet, said turning means being mounted for translation toward and away from said discharge zone along said second path to each of a predetermined series of dumping points spaced therealong, and means responsive to receipt of a wrapped article by said turning means and to positioning of said turning means at one of said dumping points for actuating the turning means to upend the article and deposit it at one of said dumping points.

10. Apparatus according to claim 9 including:

(c) means responsive to arrival of said turning means at a terminal one of said dumping points for advancing an article receiving pallet at said dumping points in a direction transverse to said predetermined path to enable series of wrapped articles to be deposited in successive rows on the pallet.

11. Apparatus according to claim 9 including:

(c) an extensible and retractable ramp bridging from said discharge station to said turning means for extension or retraction, with movement of said turning means along said path for supporting articles as they roll from said discharge station to said turning means at any point of travel of the turning means along said path.

12. A wrapping and palletizing apparatus for cylindrical articles comprising:

(a) wrapping apparatus including a first inclined ramp with its lower end adjacent to a wrapping location, transfer means operable to position articles at the upper end of said first ramp so that they roll down to said wrapping location along a first path normal to their cylindrical axis, said wrapping apparatus providing first means at said wrapping location supplying wrapping material having an edge engaged by a longitudinal portion of an article at said wrapping location, said wrapping apparatus providing second means to supply adhesive between said edge and said longitudinal portion so that said edge is adhesively bonded to said longitudinal portion, said wrapping apparatus providing third means at said wrapping location to cause rotation of said article about said axis to cause said article to be wrapped by said wrapping material after said edge is adhesively bonded thereto, said wrapping apparatus also including a second inclined ramp along which said wrapped articles roll along a second path to a discharge zone at said palletizing apparatus, said cylindrical axis of said articles remaining in a fixed orientation as articles move through said wrapping apparatus;

(b) palletizing apparatus including an article receiving trough normally oriented parallel to articles rolling along said second inclined ramp for receiving the wrapped articles one at a time as they arrive at said trough, said trough being mounted for translation along said second path toward and away from said discharge zone to each of a predetermined sequence of dumping points spaced therealong, and means actuatable upon arrival of a wrapped article at said trough at any of said dumping points for upending a trough and a wrapped article therein and spotting the upended wrapped article on a receiving surface; and, (c) an extensible and retractable ramp bridging from said discharge zone to said article receiving trough for retraction and extension in response to movement of said trough toward and away from said discharge zone, whereby said trough, while positioned at any of a sequence of upending stations along said predetermined path, may receive a wrapped article rolling along said extensible and retractable ramp from said discharge zone.

References Cited

UNITED STATES PATENTS

| | | | |
|---|---|---|---|
| 2,261,344 | 11/1941 | Delegard | 53—214 X |
| 1,135,294 | 4/1915 | Knapp et al | 53—214 |
| 1,862,170 | 6/1932 | Andelin | 53—214 |
| 2,681,534 | 6/1954 | Way | 53—214 X |
| 3,127,721 | 4/1964 | Burton. | |
| 3,147,845 | 9/1964 | Harrison et al. | 209—125 X |
| 3,183,642 | 5/1965 | Tindall | 53—251 |
| 3,200,558 | 8/1965 | Adams et al. | 53—383 X |
| 3,266,213 | 8/1966 | Harris et al. | 53—211 X |

FOREIGN PATENTS 923,868    4/1963    Great Britain.

THERON E. CONDON, *Primary Examiner.*

NEIL ABRAMS, *Assistant Examiner.*

U.S. Cl. X.R.

53—54; 214—1; 209—122; 221—221, 224, 251